(12) United States Patent
Howie

(10) Patent No.: US 11,748,830 B2
(45) Date of Patent: Sep. 5, 2023

(54) DISTRIBUTED LEDGER BASED SYSTEM AND METHOD FOR THE SETTLEMENT AND TRANSFER OF TITLE TO REAL ESTATE

(71) Applicant: TELLURIUM INC, Lincoln, CA (US)

(72) Inventor: David Howie, Lincoln, CA (US)

(73) Assignee: TELLURIUM INC., S Lake Tahoe, CA (US)

( * ) Notice: Subject to any disclaimer, the term of this patent is extended or adjusted under 35 U.S.C. 154(b) by 386 days.

(21) Appl. No.: 16/637,828

(22) PCT Filed: Aug. 13, 2018

(86) PCT No.: PCT/US2018/046408
§ 371 (c)(1),
(2) Date: Feb. 10, 2020

(87) PCT Pub. No.: WO2019/033090
PCT Pub. Date: Feb. 14, 2019

(65) Prior Publication Data
US 2020/0175623 A1    Jun. 4, 2020

Related U.S. Application Data

(60) Provisional application No. 62/544,011, filed on Aug. 11, 2017.

(51) Int. Cl.
*G06Q 50/16*    (2012.01)
*G01S 19/01*    (2010.01)
(Continued)

(52) U.S. Cl.
CPC ............ *G06Q 50/165* (2013.01); *G01S 19/01* (2013.01); *G06F 16/27* (2019.01); *G06Q 10/10* (2013.01);
(Continued)

(58) Field of Classification Search
CPC ...... G06Q 50/165; G06Q 50/18; G06Q 10/10; G06Q 20/389; G06Q 20/40145;
(Continued)

(56) References Cited

U.S. PATENT DOCUMENTS 6,910,045 B2    6/2005 Hickey et al.
7,092,957 B2    8/2006 Klein
(Continued)

FOREIGN PATENT DOCUMENTS

WO    2016196496    12/2016

OTHER PUBLICATIONS

Chang et al. "A Fully Automated Content-Based Video Search Engine Supporting Spatiotemporal Queries", IEEE Transactions on Circuits and Systems for Video Technology, vol. 8, No. 5, Sep. 1998, pp. 602-615 (Year: 1998).*

(Continued)

*Primary Examiner* — James D Nigh
(74) *Attorney, Agent, or Firm* — Dvorah Graeser; Graeser Associates International Inc

(57) ABSTRACT

A system and method of the present invention, in at least some embodiments, provides such a solution for determination of the boundaries of a parcel through a calculable solution, which is also operable when multiple units within a parcel are owned by different entities. The solution features calculation of a centroid that also features altitude. Optionally, the centroid is calculated as a single three dimensional (3D) centroid. Alternatively, it is calculated as a two dimensional centroid and then the third dimension is calculated separately.

21 Claims, 25 Drawing Sheets

(51) Int. Cl.
*G06F 16/27* (2019.01)
*G06Q 10/10* (2023.01)
*G06Q 20/38* (2012.01)
*G06Q 20/40* (2012.01)
*G06Q 50/18* (2012.01)
*H04L 9/08* (2006.01)

(52) U.S. Cl.
CPC ..... *G06Q 20/389* (2013.01); *G06Q 20/40145* (2013.01); *G06Q 50/18* (2013.01); *H04L 9/0819* (2013.01); *G06Q 2220/18* (2013.01)

(58) Field of Classification Search
CPC ..... G06Q 2220/18; G06F 16/27; G01S 19/01; H04L 9/0819
USPC .......................................................... 705/59
See application file for complete search history.

(56) References Cited

U.S. PATENT DOCUMENTS

| | | | |
|---|---|---|---|
| 7,324,666 | B2 | 1/2008 | Zoken et al. |
| 7,890,509 | B1* | 2/2011 | Pearcy ................. G06Q 50/165 |
| | | | 707/754 |
| 2002/0035432 | A1* | 3/2002 | Kubica ................... G06F 16/29 |
| | | | 702/5 |
| 2003/0225693 | A1 | 12/2003 | Ballard et al. |
| 2006/0026136 | A1 | 2/2006 | Drucker et al. |
| 2014/0310162 | A1* | 10/2014 | Collins ............... G06F 3/04842 |
| | | | 707/769 |
| 2015/0248503 | A1 | 9/2015 | Glunz et al. |
| 2015/0310497 | A1 | 10/2015 | Valin |
| 2015/0332325 | A1* | 11/2015 | Sharma .............. G06Q 30/0259 |
| | | | 705/14.57 |
| 2016/0077190 | A1* | 3/2016 | Julian ................... G01S 5/0278 |
| | | | 342/451 |
| 2016/0300234 | A1 | 10/2016 | Moss-Pultz et al. |
| 2017/0041148 | A1 | 2/2017 | Pearce |
| 2017/0249712 | A1* | 8/2017 | Branscomb ............ G06Q 10/00 |

OTHER PUBLICATIONS

Propy White Paper, "Global Property Store with decentralized title registry", published Jul. 17, 2017, by Propy; https://whitepaper.io/coin/propy.

The Tellus Blockchain Protocol white paper, By: David J. Howie, published on www.tellurium.io, Jul. 5, 2018.

Foam draft technical white paper, published Jan. 5, 2018, by Foamspace Corp; https://github.com/f-o-a-m/public-research.

Foam white paper, published Jan. 5, 2018, by Foamspace Corp; https://foam.space/publicAssets/FOAM_Whitepaper.pdf.

"The XY Oracle Network: The Proof-of-Origin Based Cryptographic Location Network", Trouw et al, Jan. 2018, https://docs.xyo.network/XYO-White-Paper.pdf.

"Blockchain: Digitally Rebuilding the Real Estate Industry", by Avi Spielman, submitted as a Master's Degree thesis to Massachusetts Institute of Technology; Sep. 2016.

"A blockchain based property ownership recording system" by Alex Mizrahi, https://static1.squarespace.com/static/5e26f18cd5824c7138a9118b/t/5e3c1c7d6d5ff061da34da80/1580997757765/A-blockchain-based-property-registry.pdf, undated.

Rex white paper, "A Decentralized Multiple Listing Service & Real Estate Transaction Application", Apr. 28, 2017, https://github.com/Stangrotic/whitepaper.

Kairos Future, "The Land Registry in the blockchain—testbed", Mar. 2017, https://www.kairosfuture.com/publications/reports/the-land-registry-in-the-block-chain-testbed/.

* cited by examiner

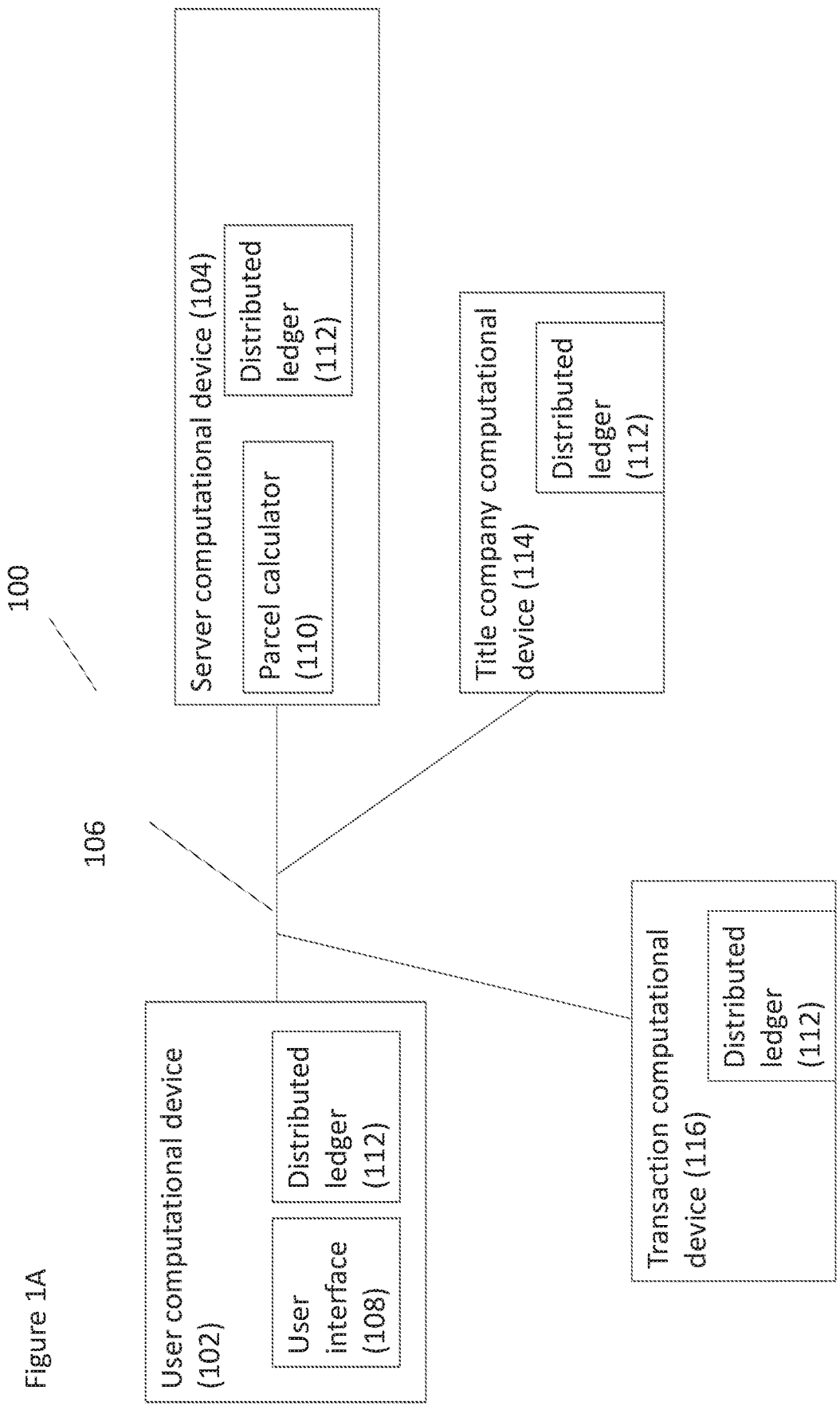

1700

LONGITUDE / LATITUDE / ALTITUDE / PROPERTY RIGHT / STATUS / PROPERTY TYPE / AMOUNT OF LOCAL FIAT / IPFS HASH OR SMART CONTRACT ADDRESS / OPTIONAL FIELDS

1702 — META DATA FIELDS

1. LONGITUDE OF PARCEL CENTROID
2. LATITUDE OF PARCEL CENTROID
3. ALTITUDE OF PARCEL CENTROID
4. PROPERTY RIGHT TYPE
5. STATUS
6. PROPERTY TYPE
7. AMOUNT OF LOCAL FIAT VALUE
8. IFPS HASH OR URL OF SUPPORTING DOCUMENTATION OR SMART CONTRACT HEADER ADDRESS
9. OPTIONAL DATA FIELDS.

META DATA FIELDS

PROPERTY RIGHT TYPE — 1704

1. FEE SIMPLE ABSOLUTE / GRANT DEED
    1.2 LIFE ESTATE
2. MORTGAGE / DEED OF TRUST
    2.2 LENS OF OTHER ENCUMBRANCES
3. LEASE HOLD ESTATE
4. EASEMENTS

STATUS — 1706

1. ACTIVE
    1.2 ACTIVE RELEASE CLAUSE
    1.3 ACTIVE SHORT SALE
    1.4 ACTIVE SHORT CONTINGENT
    1.5 ACTIVE COURT APPROVAL
    1.6 ACTIVE COURT CONTINGENT
2. OFF MARKET
2. PENDING
    3.2 PENDING SHORT SALE APPROVAL
    3.3 PENDING BRING BACKUP
4. SOLD
5. EXPIRED PENDING
    5.2 EXPIRED
6. DUPLICATE WITHDRAWN
    6.2 WITHDRAWN/CANCELED

PROPERTY TYPE — 1708

1. RESIDENTIAL - SINGLE FAMILY RESIDENCE
    1.2 2 HOUSE ON LOT
    1.3 3+ HOUSE ON LOT
    1.4 CONDO
    1.5 CO-OP
    1.6 HALFPLEX
    1.7 DUPLEX
    1.8 TRIPLEX
    1.9 FOURPLEX
2. LAND
    2.2 RESIDENTIAL LOT
    2.3 RESIDENTIAL ACREAGE
    2.4 COMMERCIAL LOT
    2.5 COMMERCIAL ACREAGE
3. COMMERCIAL
    3.2 RETAIL
    3.3 OFFICE
    3.4 HOTEL
    3.5 INDUSTRIAL
    3.6 MIXED USE
    3.7 APARTMENTS (5 OR MORE UNITS)

FIG. 17

DISTRIBUTED LEDGER BASED SYSTEM AND METHOD FOR THE SETTLEMENT AND TRANSFER OF TITLE TO REAL ESTATE

FIELD OF THE INVENTION

The present invention is of a system and method for calculation of the boundaries of a parcel for real estate through a distributed ledger, and in particular, to such a system and method for management of parcel title through a distributed ledger.

BACKGROUND OF THE INVENTION

The blockchain is becoming more widely used as a store of information, for example for proof of transactions. Originally, the blockchain was developed to serve such cryptocurrencies as bitcoin. However, the ability to store information that cannot be fraudulently altered is an increasing attractive feature of the blockchain.

One area in which information must be strongly proved to be valid is for real estate titles. Real estate title determines not only who owns a property, but also the boundaries of that property, known as a parcel. Lengthy court battles may be fought over proof of ownership of a property, proof of transfer—but also proof of the boundaries of the property.

In March 2017, Kairos Future published "The Land Registry in the blockchain—testbed". This project was performed in conjunction with Lantmäteriet (a government land authority), Landshypotek Bank, SBAB, Telia company, ChromaWay and Kairos Future, to attempt to provide real estate proof of title and transfer through the blockchain.

The REX white paper (Stephen King and Russell McLernon, August 2016) describes a system for multiple listings of real estate and for real estate transfer on the blockchain. This system would allow access to up to date listings by multiple entities, rather than being restricted to real estate agents, for example.

Various decentralized blockchain based property registry and/or Geo located Blockchain systems have been proposed, including PROPY (July 2017),FOAM (May 2018) and XY Oracle Network (January 2018). PROPY in particular seeks to leverage smart contracts to reduce issues of trust, and need for verification of property ownership and transactions. FOAM seeks to provide proof of location for IoT devices and real property. XY Oracle Network aims to provide geo located oracle services for smart contract platforms.

U.S. Pat. No. 7,890,509 describes a service to maintain a title registry entirely through software, but unfortunately without the benefits of the blockchain. The patent describes a variety of ways to identify the parcel, for example according to the mailing address or some type of geocoding such as calculating the centroid through latitude and longitude, but does not describe any way to identify the parcel that can be automatically calculated through a computational process.

U.S. Pat. No. 7,324,666 attempts to directly connect geocodes to street addresses, but is unable to solve the problem of multiple units within a single parcel, such as within a single building, being owned by different entities. Their geocoding method in such a situation is inoperative.

WO2016196496 also attempts to connect geofences to IP addresses and hence to a situation in which parcels can be defined on a blockchain. But this method is also inoperative when multiple units within a parcel are owned by different entities.

BRIEF SUMMARY OF THE INVENTION

The background art does not provide a solution for determination of the boundaries of a parcel through a calculable solution, when multiple units within a parcel are owned by different entities.

The background art also does not provide a solution for title management and transfer through the automatic calculation of property boundaries outside of a simple two dimensional parcel calculation.

The background art also does not provide a solution for title management and transfer through the blockchain when multiple units within a parcel are owned by different entities.

The system and method of the present invention, in at least some embodiments, provides such a solution for determination of the boundaries of a parcel through a calculable solution, which is also operable when multiple units within a parcel are owned by different entities. The solution features calculation of a centroid that also features altitude. Optionally, the centroid is calculated as a single three dimensional (3D) centroid. Alternatively, it is calculated as a two dimensional centroid and then the third dimension is calculated separately.

Without wishing to be limited by a closed list, this solution permits title analysis, management and transfer according to an automatic calculation of parcel boundaries for situations which cannot be determined through a two dimensional calculation alone. Non-limiting examples of such situations include transfer of a single unit, such as an office or apartment, within a building featuring multiple such units having different owners, or intended to have different owners (such as for example when sold by a builder or developer); or transfer of separate air rights from a building owner.

According to at least some embodiments, the method may feature analysis of parcel boundary information on the distributed ledger associated with the blockchain as a store of information. The parcel boundary information may also optionally be stored elsewhere.

When stored on the distributed ledger, optionally also title management is performed through the distributed ledger, for example to determine whether a purported owner of a parcel is the actual owner. Also optionally, title transfer may occur through the distributed ledger.

Optionally biometric controls are imposed to prevent fraudulent transfer. For example, such biometric controls may optionally include facial geometry (for example through a live selfie), retinal scan, fingerprint, palmprint or other hand scan, and the like. Optionally, such additional proof of identity is tied to IP addresses to develop a digital signature that could access a wallet of different blockchain addresses to transact on this blockchain. In a permissioned based implementation, depending on the permissions granted and the role to be performed, the user could have different addresses for different roles, i.e., a regulator (or county official, or broker) may want to maintain a node and transact on this blockchain in a specific role identified as a "regulator" by their public key, but then when transacting as a private citizen to purchase, record, or sell, they may use a different address/public/private key for those purposes. Optionally, biometric proof could authentic them to access their wallet of different addresses.

The wallet secured by biometrics may include addresses to transact on other types of distributed ledger and/or blockchain systems as well so that there is interoperability for various types of cryptocurrencies or other such systems for value transfers to complete a real estate sales transaction on this blockchain.

Optionally the biometric data is used to generate the private key, which would prevent loss of the key but would not solve the situation in which the owner was unable to participate, for example due to being deceased, or unwilling to participate, in a transfer.

With regard to a trustee or regulator (in a permissioned based implementation), such as a title company or state department/bureau of real estate, optionally such an entity could maintain a node of the network that would have special permissions and capabilities to manage real estate transactions. For example, optionally a trusted node would have the ability to override control of the current owner of the parcel. Optionally such a node could induce transfer of the parcel even without participation of the current owner. Such a situation may arise if the current owner is unwilling or unable to participate in the transfer. Optionally, the signature of, or instructions from, a plurality of such trusted nodes would be required to induce a transfer in such cases.

A regulator could perhaps see all public addresses associated with any state real estate license, and have special privileges that could revoke transaction privileges for those public addresses associated with a license if a licensed expired or was not renewed before expiration or was revoked for negligence for transactions with geocodes within that jurisdiction.

In a permissionless open sourced implementation, interactions (native token transfers with geo coded meta data) between parties would be unregulated and strictly governed by game theory and incentives. Bad actors and spammers could attempt to cloud titles with irrelevant data. In this scenario, during data analysis, filters could be put in place to only view transactions by white listed parties willing to defend their publicly recorded claims on the blockchain such as honest good actors and regulated parties willing to participate in an open source peer to peer environment.

With the inherit characteristic of each transaction being geocoded in the metadata, this protocol allows it to be universal, in some embodiments, in that each unit of cryptocurrency on this distributed ledger could be pegged to the native fiat currency for each transaction. This allows simplification of adoption by jurisdictions not needing to introduce legislation for value transfers not denominated in the local currency. It also allows for a simple time series data structure for real estate market analysis that is already denominated in the properties local currency without the need for cryptocurrency-forex calculations.

Any suitable blockchain which involves a distributed ledger, which preferably requires some type of cryptography, more preferably a public/private key encryption system, or hash or digital signatures, may optionally be used. Once a change—such as acceptance of a contract for a sale of property—is made and is written to the distributed ledger, this change is automatically securely, non-falsifiably, that is completely accurately, replicated to all network participants.

The nature of the distributed ledger is such that all parties to a transaction can see the details of the transaction and optionally further requirements for the transaction to be complete.

Such a distributed ledger would also have the advantage of fraud prevention with immutable, append-only Distributed Ledger Technology. For example, users attempting to fraudulently sell a property that they do not possess would be blocked from future rights to the system in a permissioned based environment or simply ignored with filters in an open source permissionless environment.

Centroids may be used to search a public decentralized database, which may for example be based on a distributed ledger, with geo-fences for all transaction related to a parcel and creating a data structure suitable for a decentralized land registry.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 1A shows a non-limiting, exemplary system for creating and analyzing titles according to the centroid method described herein;

FIG. 17 shows non-limiting examples of these fields and the associated metadata as fields in the distributed ledger.

DESCRIPTION OF AT LEAST SOME EMBODIMENTS

Figure 1B:
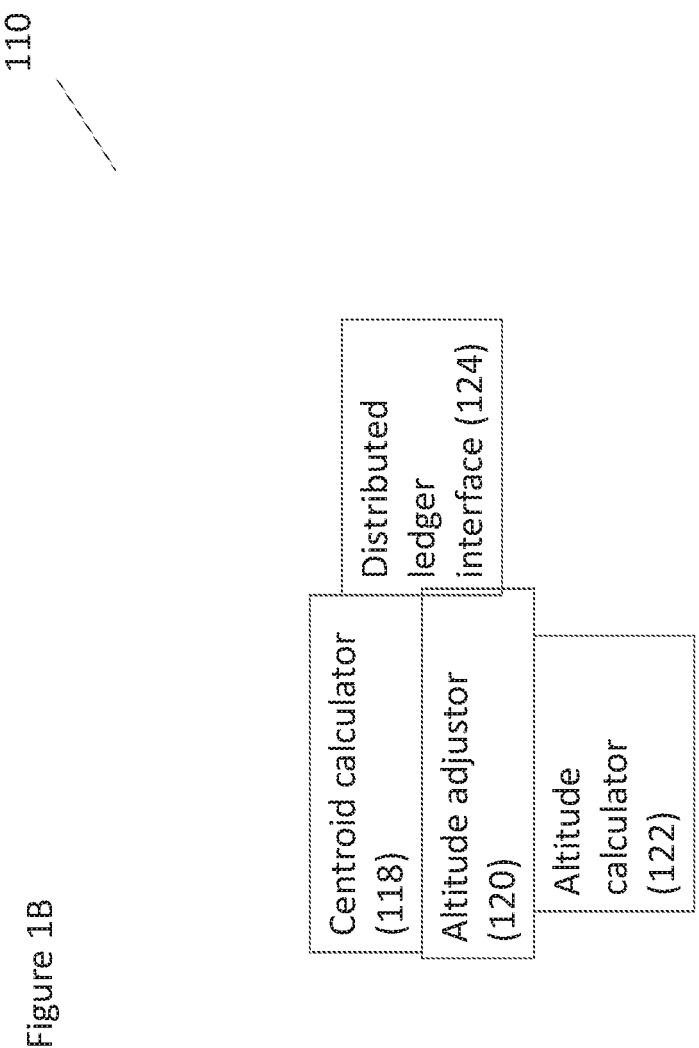
FIG. 1B shows a non-limited example of parcel calculator 110 from FIG. 1A.

The present invention, in at least some embodiments, features a protocol for a distributed ledger that incorporates a system and method for calculation of the boundaries of a parcel of real estate. The distributed ledger may be implemented on any suitable blockchain. The calculation provides for a cryptographic geocoded method of consensus embedded within the metadata of each transaction on a distributed ledger. This protocol, optionally based upon a cryptographic currency, supports a virtual wallet, which in various embodiments, provides an additional layer of security by linking the biometrics of a user to their virtual wallet and the assets held in the wallet. Such a system for the settlement of real estate transactions provides a method to reduce the inherit risk associated with title insurance.

The description as provided herein is intended to be exemplary and non-limiting. Optionally, for example, one or more procedures related to the Real Estate Settlement Procedures Act (RESPA) are included (see for example https://www.nar.realtor/topics/real-estate-settlement-procedures-act-respa). RESPA details permitted and forbidden procedures, for example in terms of relationships between real estate agents, mortgage brokers and title companies—and how they can interact in business. Optionally procedures could be executed through the system and method of the present invention that would be RESPA compliant or RESPA supportive.

According to at least some embodiments the blockchain is optionally a public or permissionless blockchain, such as Bitcoin or Ethereum, which is decentralized and which is a blockchain that anyone in the world can read, anyone in the world can send transactions to and expect to see them included if they are valid, and anyone in the world can participate in the consensus process for determining what blocks get added to the chain and what the current state is. As a substitute for centralized or quasi-centralized trust, public or permissionless blockchains are secured by cryptoeconomics—the combination of economic incentives and cryptographic verification using mechanisms such as proof of work or proof of stake, following a general principle that the degree to which someone can have an influence in the consensus process is proportional to the quantity of economic resources that they can bring to bear.

Alternatively and optionally, the blockchain is a consortium blockchain, such as Hyperledger, where the consensus process is controlled by a pre-selected set of nodes, which for example may optionally be financial institutions. Such a blockchain is partially decentralized.

If the blockchain is private or permissioned—that is, centrally controlled by an operating entity to authorize participation—then optionally all members of the system as described by the present invention which need access are provided with cryptographic access, and become members of the private or permissioned blockchain system, such as Hyperledger.

Hyperledger has its own set of protocols and consensus process, which may optionally be used with smart contracts, to prevent fraud.

One of ordinary skill in the art could easily select a distributed ledger and implement it within various embodiments of the present invention, for example according to information provided in "Blockchain Basics: Introduction To Business Ledgers" by Brakeville and Perepa, IBM, May 9, 2016.

A crypto asset, distributed ledger, or blockchain is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies such as used in bitcoin. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person), and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases, that meets other criteria. In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue creating new blocks.

Preferably the blockchain(s) that is/are implemented are capable of running code, to facilitate the use of smart contracts. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contracts may also be described as pre-written logic (computer code), stored and replicated on a distributed storage platform (eg a blockchain), executed/run by a network of computers (which may be the same ones running the blockchain), which can result in ledger updates (cryptocurrency payments, etc).

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Not all blockchains can execute all types of smart contracts. For example, Bitcoin cannot currently execute smart contracts. Sidechains, i.e. blockchains connected to Bitcoin's main blockchain could enable smart contract functionality: by having different blockchains running in parallel to Bitcoin, with an ability to jump value between Bitcoin's main chain and the side chains, side chains could be used to execute logic. Smart contracts that are supported by sidechains are contemplated as being included within the blockchain enabled smart contracts that are described below.

For all of these examples, security for the blockchain may optionally and preferably be provided through cryptography, such as public/private key, hash function or digital signature, as is known in the art.

Turning now to the figures, FIG. 1A shows a non-limiting, exemplary system for creating and analyzing titles according to the centroid method described herein. As shown, a system 100 features a user computational device 102 in communication with a server computational device 104 through a network 106. Network 106 may optionally be any type of computational network, including, but not limited to the Internet. User computational device 102 operates user interface 108 for receiving one or more user commands and for displaying information to the user.

User computational device 102 features a processor (not shown) for performing various instructions and commands. As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 108 generally includes a plurality of interface devices and/or software that allow a customer to input commands and data to direct the processing device to execute instructions. For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other input/output devices.

User computational device 102 may also optionally operate with a copy of the distributed ledger 112. Distributed ledger 112 preferably stores all information regarding the different titles at least including the centroid calculation as described herein. The centroid calculation as described in further detail below preferably includes coordinates of the centroid for locating a property on a geographical location. The centroid preferably also includes information with regard to altitude; that is to say the altitude of the rights associated with the property.

As such, the centroid could optionally be described as a 3D or 3 dimensional centroid. The distributed ledger as described in greater detail may optionally be any type of distributed ledger whether permissioned blockchain, permissionless blockchain, and the like. Non-limiting examples of such include Bitcoin, Ethereum based systems, and Hyperledger based systems, as well as any suitable blockchain as described herein. Server computational device 104 operates the personal calculator 110 that supports the calculation of the centroid and optionally also other information needed to determine the location of the property or parcel under consideration.

Again, server computational device 104 may have access to a distributed ledger 112. Preferably system 100 also includes a transactional computational device 106 and a title company computational device 114. Title company computational device 114 may optionally be used to search through titles, analyze titles, determine if title conflicts exist, and the like. This may be done for example and without limitation, by performing a point in polygon test where the parcel being analyzed is described as a polygon and all previously recorded centroid points on the blockchain are tested to be either inside or outside the polygon in question. All previously recorded transactions with a centroid inside the polygon would be part of the property's history and chain of title. Optionally title company computational device 114 may also act as a trustee or super privileged member operating distributed ledger 112. In this example, title company computational device 114 is permitted to add a block to the distributed ledger to indicate a change or transfer of ownership, or a change in the parcel or property under consideration.

Transactional computational device 116 preferably handles transactions such as purchases, sales, and the like. FIG. 1B shows a non-limited example of parcel calculator 110 from FIG. 1A. As shown, parcel calculator 110 preferably includes a centroid calculator 118, preferably for calculating the previously described 3 dimensional centroid, and altitude adjuster 120. Altitude adjuster 120 is preferably used as part of the centroid calculation to determine the altitude of the parcel, property in consideration, and/or of rights associated with that parcel or property, such as for example without limitation, air rights.

Altitude calculator 122 is preferably present to assist altitude adjuster 120 in actually calculating the altitude associated with the parcel or property. A distributed ledger interface 124 enables parcel calculator 110 to receive information from the distributed ledger. It may also should be used to write such information to the distributed ledger although alternatively such writing to the distributed ledger may not be permitted.

Figure 1C:
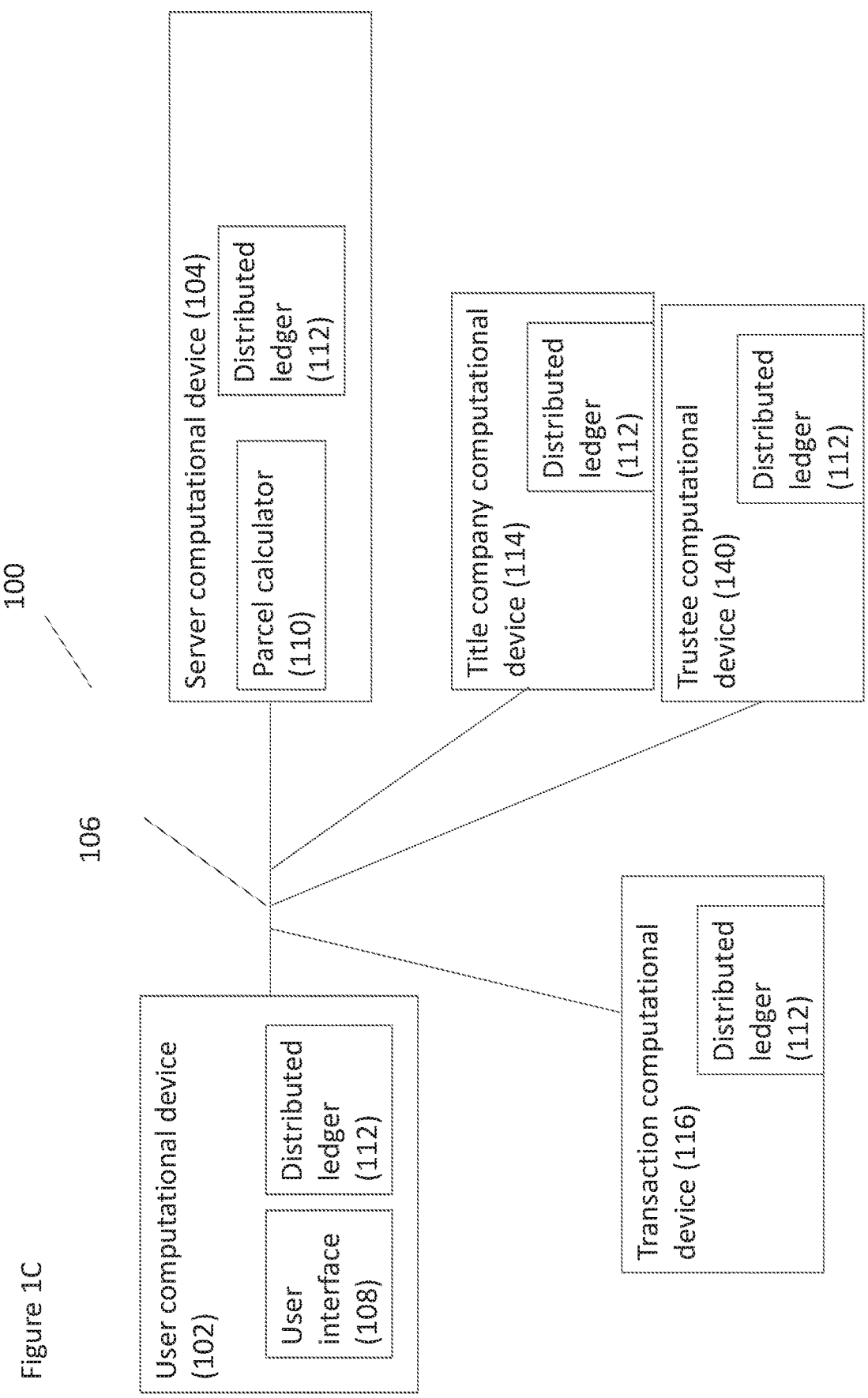
FIG. 1C shows another non-limiting exemplary system according to some embodiments.

FIG. 1C shows another non-limiting exemplary system according to some embodiments. In this system 100, a trustee computational device 140 is also present. Trustee computational device 140 is permitted to write to distributed ledger 112 optionally in place of title company computational device 114. Trustee computational device 140 may optionally be operated by a company acting as a trustee by one or more organizations which together interact through trustee computational device 140 to act as trustee, or by a DAO, distributed autonomous organization. Trustee computational device 140 may control one or more smart contracts. As described herein, such smart contracts may be used to automatically trigger one or more actions associated with the sale of a property and transfer of property rights.

Figure 2:
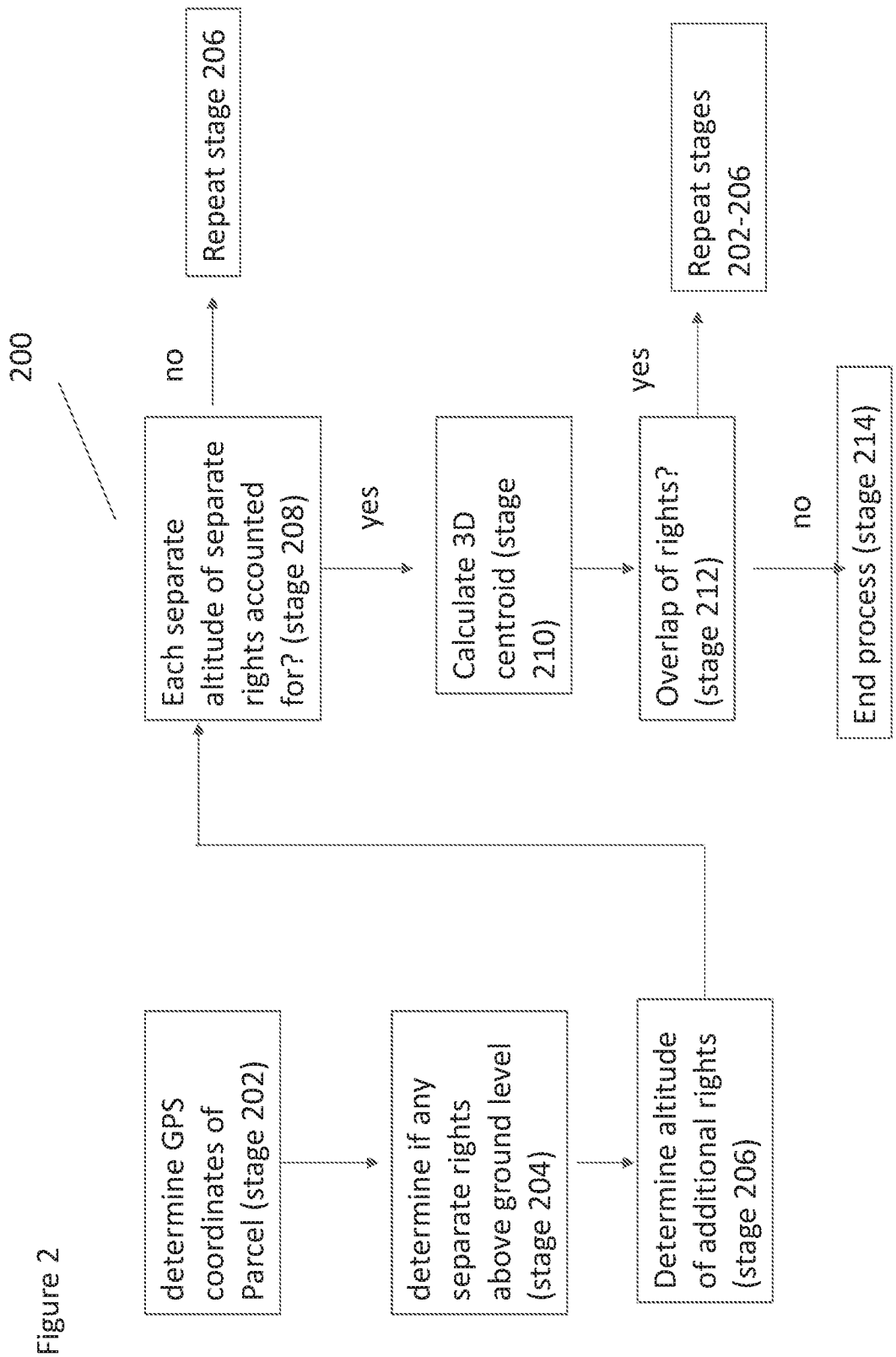
FIG. 2 shows a non-limiting exemplary method for centroid calculation.

FIG. 2 shows a non-limiting exemplary method for centroid calculation. As shown in the method 200, the process preferably starts with stage 202, with determining the GPS coordinates of the parcel or property under consideration. Preferably this method is used for application to real estate, that is to land, a building, other structures, air rights associated with same and the like. Preferably this method is not used for property that may be considered to be moveable or transportable.

Next in stage 204, it is determined if any separate rights exist above ground level, such as a building for example, which may exist above ground level and which may be determined according to any height requirements, and/or air rights which in some circumstances may be sold separately from the rest of the parcel. If such additional rights exist then in stage 206 the altitude of such additional rights is determined. Next it is determined whether each separate altitude for each separate right has been accounted for in stage 208. Various separate rights may optionally include for example, multiple units within a building, perhaps multiple offices, or multiple apartments each of which may be sold separately. It may also be possible to determine the altitude for rights associated with the building itself and air rights above the building. If each has separate altitude has not been accounted for then stage 206 is repeated until it has been accounted for. Once each separate altitude has been accounted for, then in stage 210 the 3D centroid is calculated.

The 3D centroid includes coordinates preferably determined as GPS coordinates as previously described and also the altitude. In stage 212 it is determined whether overlapping rights exist. If overlapping rights exist, such as for example a situation in which the rights may actually be owned by more than one entity, or perhaps rights that were not fully separated in the previous analysis, such as for example apartments which may be joined together, but which may have the right to be separated, then stages 202 to 206 are preferably repeated. If not, then the process ends in stage 214.

Figure 3:
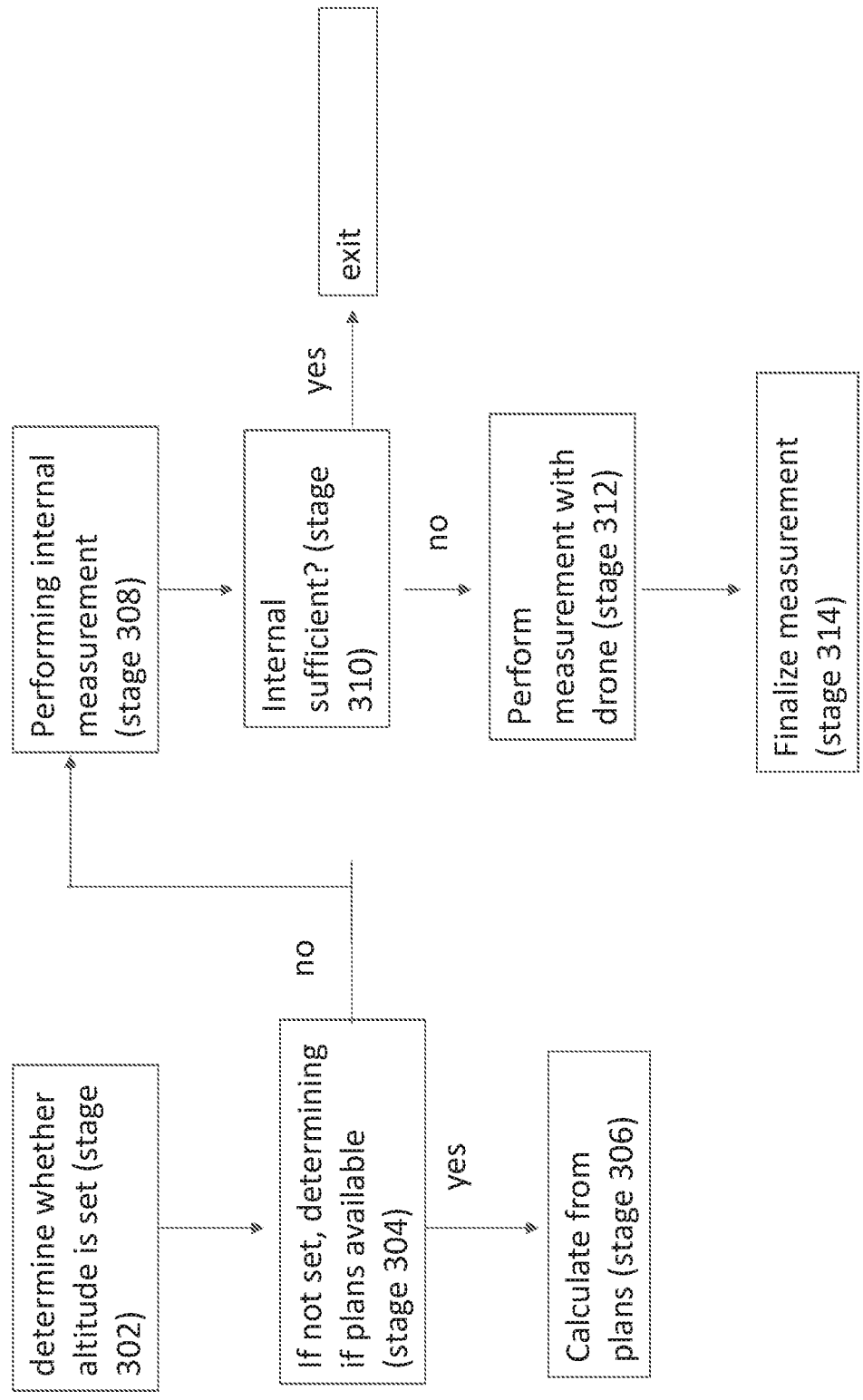
FIG. 3 shows a non-limiting exemplary method for altitude determination.

FIG. 3 shows a non-limiting exemplary method for altitude determination. As shown in the method 300, stage 302 involves determination of whether the altitude has been set; that is whether the altitude information is known. If the altitude information is not known or set, then it is determined whether plans are available in stage 304. For example, plans for the building, plans for the structure which could be used to indicate the altitude. If such plans are available, then the altitude is preferably calculated from the plans in stage 306.

If such an altitude is not available from the plans, or if such calculation fails, or if further determination of such altitude is required or requested, then in stage 308 preferably an internal measurement is performed. For example, it is possible to have a person or robot with a wearable device containing survey grade LiDAR sensors enter the building and walk up through the stairs and walk around it in order to determine and measure the altitude. It is also possible to perform such an internal measurement on the immediate exterior of the building. This may be accomplished for example by having a person or robot crawl up the exterior of the building to determine altitude at each stage.

If the internal determination of altitude is sufficient as determined in stage 310, then the process may end with finalization of the measurement in stage 314. If not, then preferably a measurement is performed with a drone as show with regard to stage 312. The measurement is then finalized in stage 314.

Figure 4:
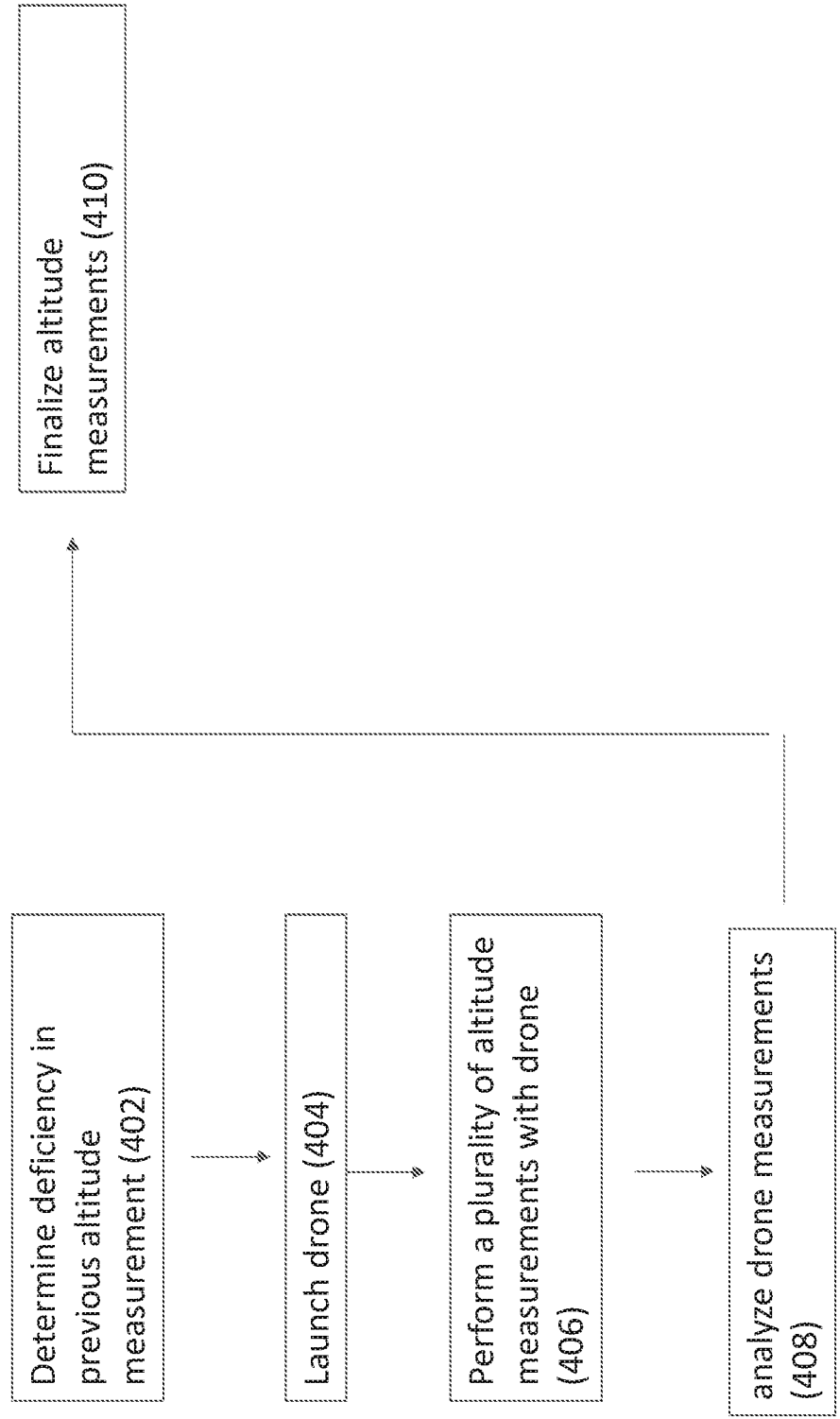
FIG. 4 shows a non-limiting exemplary method for drone altitude determination.

In FIG. 4 there is shown a non-limiting exemplary method for drone altitude determination, which may for example assist the method of FIG. 3 for altitude determination. In a method 400 the process preferably starts with determining a deficiency in the previous altitude measurement in stage 402, such as for example, inability to determine altitude from the plans and also preferably inability to determine altitude from other measurements such as internal measurements. In stage 404, the drone is launched. In stage 406 a plurality of altitude measurements is performed with the drone; for example, using a laser or optic guidance or other type of altitude measurements to determine the altitude of one or more parts of the building.

In stage 408 the drone measurements are analyzed. In stage 410 the altitude measurements are finalized in order to determine the final altitude or altitudes if the plurality of altitudes is possible.

Figure 5:
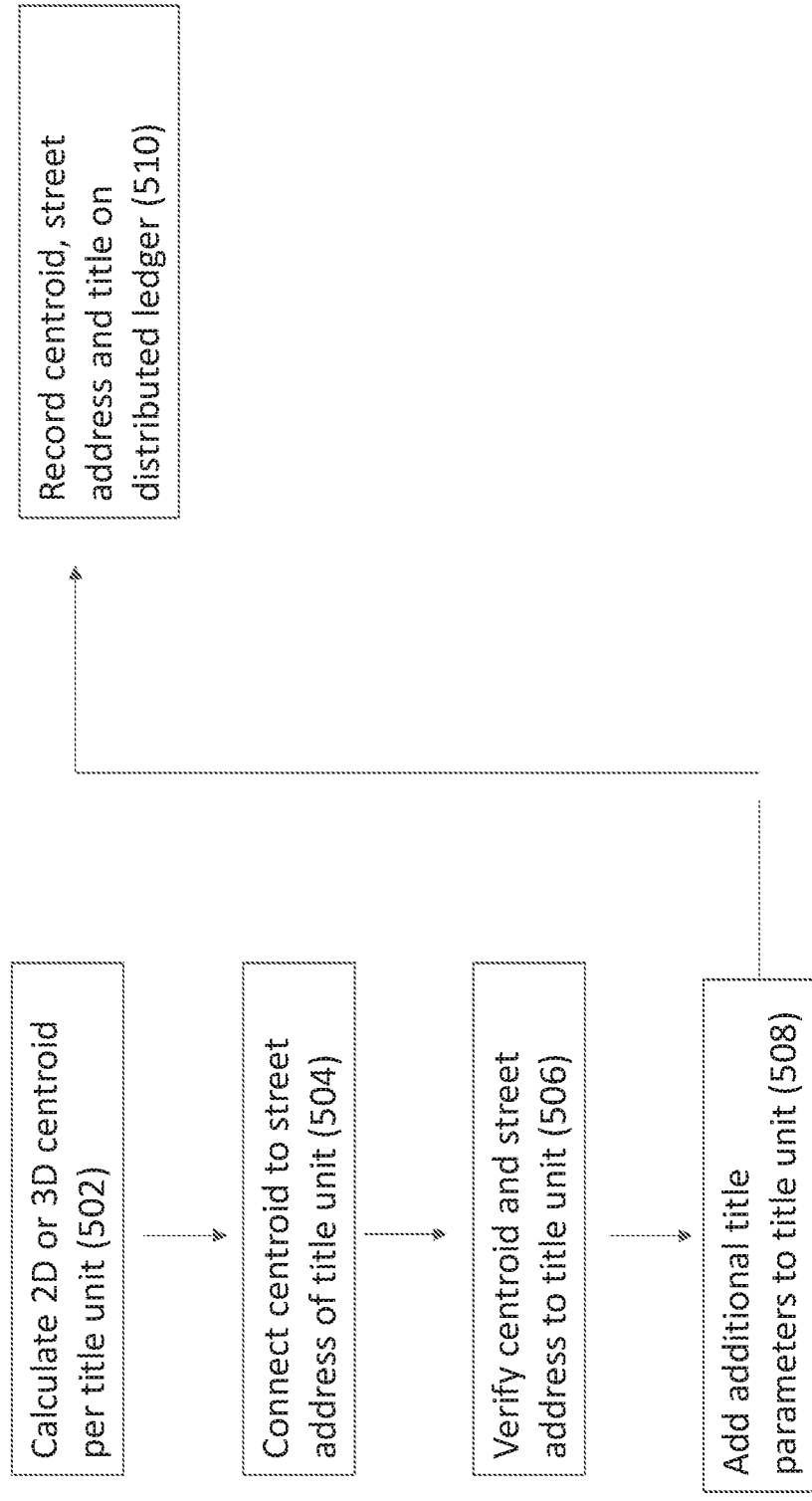
FIG. 5 relates to a non-limiting exemplary method for centroid to title mapping.

FIG. 5 relates to a non-limiting exemplary method for centroid to title mapping. As shown in a method 500 the process preferably starts in stage 502 with calculating the 2D or 3D centroid per title unit. Preferably the 3D centroid is calculated as this also includes altitude.

In stage 504 the centroid is connected to the street address of the title unit. This for example may be a number plus a name of the street, such as 1 State Street. If there are more than one unit existing within the location of 1 State Street, that is that street address, then optionally if further identifiers added such as apartment 100, suite 502, and the like. Next in stage 506, the centroid in street address are verified as being connected to the title unit.

Such verification may optionally occur, such as for example rechecking the centroid calculation in terms of the title unit parameters such as the coordinates as described on a land plat. In stage 508 one or more additional title parameters are optionally added to the title unit. For example, is the title unit to a free hold estate—that is real property, that may include rights to the ground itself, that is owned according to the title records. Or is the property a lease hold estate, in which case the location is only leased for a certain period of time. Then in stage 510 the centroid street address and title are recorded on the distributed ledger.

Optionally this information is recorded on the distributed ledger, which as previously described is preferably a specific blockchain relating to real property in some fashion for each transaction. In one use case for the blockchain it can be used to record all the transactions on each line item on a final closing escrow statement where there are multiple parties (Buyer, Seller, Lender, Title Company, Escrow Company, Appraiser, Brokers, etc.) Each line item on a closing statement would correspond to a transaction on the blockchain where the metadata has the Centroid and other data necessary to distinguish the transaction type. If a system of 5 sets of integers is used as the metadata, it is possible to create a protocol with defined transaction types and create meaningful time series data as each block is also time stamped. The 5 sets of data are (Longitude, Latitude, Altitude, Property Right Type, Property Status). The first 3 will accurately distinguish the location of the property, the 4th distinguishes between a transaction relating to fee simple absolute property rights, leasehold estate, life estate, easement, lien, or other encumbrances. The 5th will distinguish the status of the property from sold, active market listing, pending sale, active court contingent listing, and active release clause, expired listing, or withdrawn or canceled listing. Such a system would provide the framework for a decentralized MLS (multiple listing service).

For example a fee simple absolute transaction will have a specific protocol in place such that it is impossible to write a parcel's genesis block for a sales transaction and transfer of ownership if there is a conflicting fee simple absolute geocoded centroid address that already exists on the blockchain with a different owner not involved with the transaction. However other property rights can have different rules to write a transaction on the block chain. For example if the property rights of an easement where to be recorded versus an active property rental listing where to be recorded on the blockchain. An easement may span over several fee simple absolute parcels or a multi-level apartment complex may have several leasehold estates recorded with a centroid residing in one 2D fee simple absolute parcel. Combining all of these different types of property rights on a distributed ledger allows transactions to take place such as rental payments, real property sales, mortgage payments, property tax payments, property insurance payments, loan servicing rights, transfer of loan servicing rights, pools of mortgage notes securitized in bond issuances, Bond issuances securitized by the tax payments from real property in certain tax districts, and other complex payment arrangements tied to property rights.

It is possible to also add a 6th field in the metadata to specify the type of property (Hotel, Office, Land, SFR, Retail, Industrial, etc.) and a 7th field to indicate the value transfer in local fiat currency, and optionally an $8^{th}$ field to reference to an IPFS hash or smart contract header address to link to more robust data sources for supporting documentation. Also a $9^{th}$ field may be added to indicate the planetary system in a multi planetary blockchain system. Additionally the transactions can be made private with a third encryption key for shielded transactions requiring privacy. Smart contracts could also hard code privacy rights into certain transaction types. For instance a trust deed recorded on the blockchain securing the mortgage rights may come with strings attached such that payment history associated with the mortgage must allow the promissory note holder to view if the mortgagor has any other mortgages on the blockchain and view the payment history associated with those other mortgages. Also in the event of default of the mortgagor a smart contract may allow a mechanism to for the promissory note holder to relinquish its' security by forcing a sale of the subject property on chain. This blockchain would in theory make markets more efficient and more transparent for a market correction to take place.

Non-limiting examples of these fields and the associated metadata are shown in FIG. 17, as fields 1700 in the distributed ledger. Metadata fields 1702 include but are not limited to 1 Longitude of parcel Centroid, 2 Latitude of parcel Centroid, 3 Altitude of Parcel Centroid, 4 Property Right Type, 5 Status, 6 Property Type, 7 Amount of Local Fiat Value, 8 IFPS Hash or Url of supporting documentation or smart contract header address and 9 Optional Data Fields.

Field codes include a Property Right Type 1704, which may include but is not limited to:
1 Fee Simple Absolute/Grant Deed
1.2 Life Estate
2 Mortgage/Deed of Trust
2.2 Liens or Other Encumbrances
3 Lease Hold Estate
4 Easements Another field code is a status 1706, which may include but is not limited to:
1 Active
1.2 Active Release Clause
1.3 Active Short Sale
1.4 Active Short Contingent
1.5 Active Court Approval
1.6 Active Court Contingent
2 Off Market
3 Pending
3.2 Pending Short Sale Approval
3.3 Pending Bring Backup
4 Sold
5 Expired Pending
5.2 Expired 6 Duplicate Withdrawn
6.2 Withdrawn/Canceled Another field code is a property type 1708, which may include but is not limited to:
1 Residential-Single Family Residence
1.2 2 Houses on lot
1.3 3+ House on lot
1.4 Condo
1.5 Co-op
1.6 Halfplex
1.7 Duplex
1.8 Triplex
1.9 Fourplex
2 Land
2.2 Residential Lot
2.3 Residential Acreage
2.4 Commercial Lot
2.5 Commercial Acreage
3 Commercial
3.2 Retail
3.3 Office
3.4 Hotel
3.5 Industrial
3.6 Mixed Use
3.7 Apartments (5 or more units)

Figure 6:
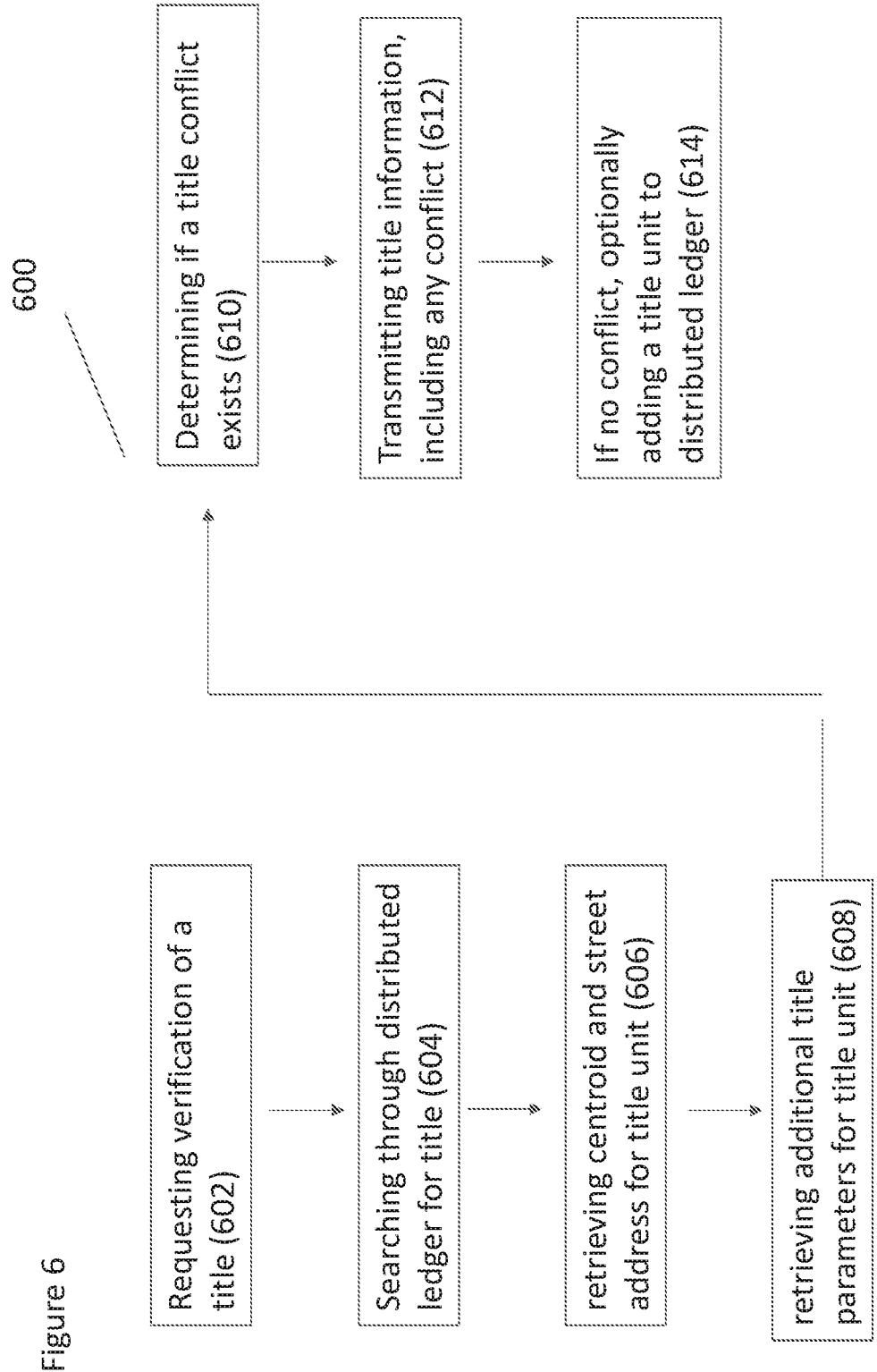
FIG. 6 relates to a non-limiting exemplary method for a title search through the distributed ledger.

FIG. 6 relates to a non-limiting exemplary method for a title search through the distributed ledger. As shown in the method 600, the process preferably starts with requesting verification of a title in stage 602. Next the distributed ledger is searched through for the title in stage 604. Once the title has been located, then the centroid in street address are preferably retrieved for the title unit from the distributed ledger as shown in stage 606. Optionally additional title parameters for the title unit are retrieved from the distributed ledger as shown in stage 608.

To determine whether a correct match to the desired property has been found, the searching process calculates the centroid of the parcel in question. This process knows the shape and the coordinate, so it can calculate centroid. A found centroid may be exact or similar, due to measurement error, for example. However the searching process can be adjusted to allow a certain amount of measurement error and still determine that a match has been found.

Next it is determined whether a title conflict exist in stage 610. Such a title conflict may exist between different properties on the distributed ledger, although preferably a checking process is performed before any new property is added to avoid such a problem. It is also possible however for a title conflict to exist between a property as already registered on the distributed ledger and a property which has not been so registered on the distributed ledger which instead has been registered through a different type of registration process such as a traditional government land registry.

Figure 7:
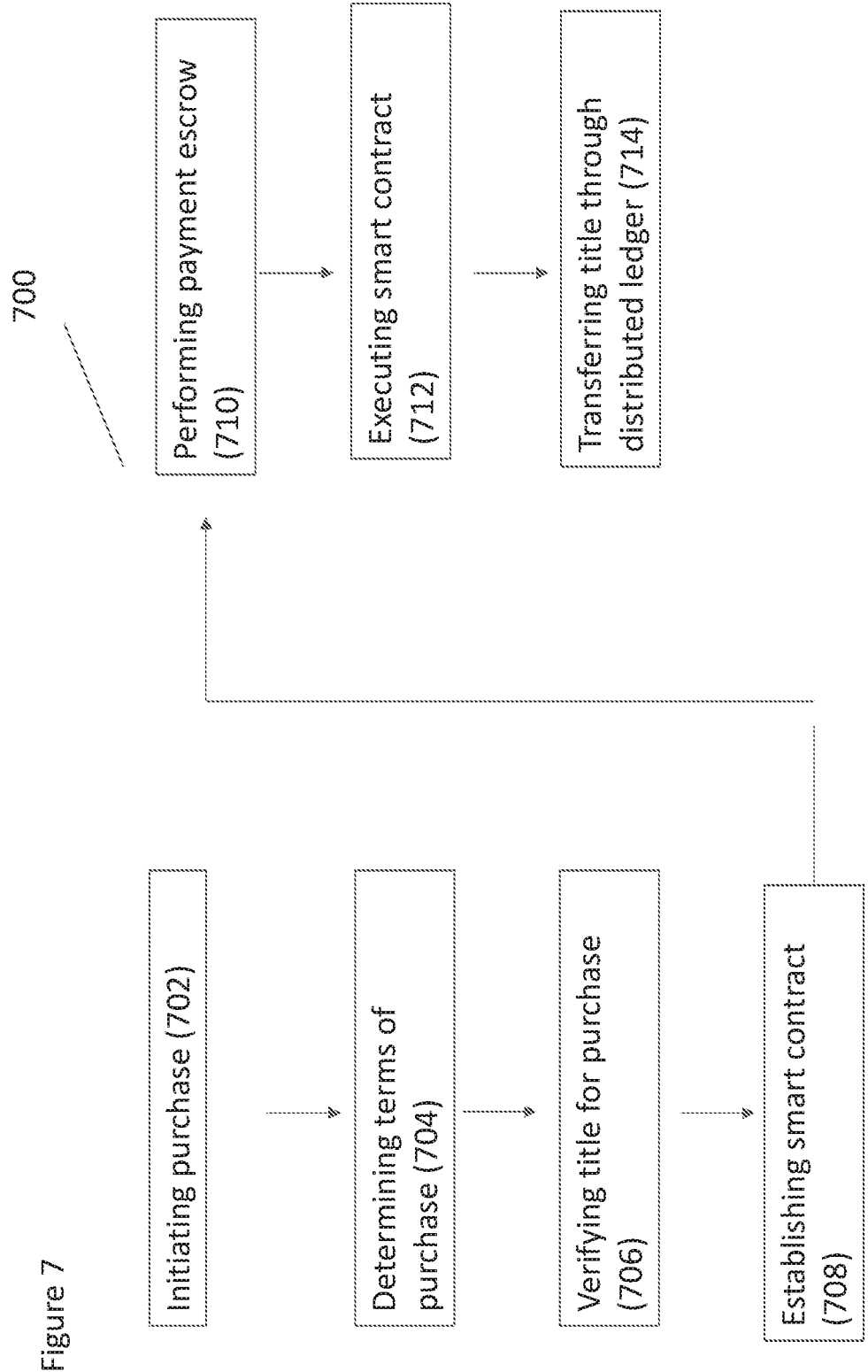
FIG. 7 relates to a non-limiting exemplary method for title transfer through the distributed ledger.

After a conflict has been found, if it is indeed is found as well as the other information such the title information, preferably all search information is then transmitted back as a search result in stage 612. If however, no conflict has been found, optionally it is possible to add a title unit to the distributed ledger in stage 614 as described in greater detail below. FIG. 7 relates to a non-limiting exemplary method for title transfer through the distributed ledger. As shown in the method 700, the process preferably starts with initiating a purchase in stage 702.

In stage 704, the terms of the purchase are determined. In stage 706 the title is verified for the purchase. Such verification is preferably performed through the method as described in FIG. 6 for a title search. However, at the very least the title is preferably verified through the distributed ledger. In stage 708 a smart contract is established for the purchase. This stage is optional and in fact, the purchase may be handled without a smart contract.

In stage 710, the performance of payment escrow occurs. Payment escrow occurs when payment is made available so that when the title transfer actually occurs, payment may be made to the seller from the buyer. Payment escrow may optionally be performed through the distributed ledger either the same or a different distributed ledger as the one on which the title is being recorded or through other means. Since blockchain type currencies, such as bitcoin, ether and the like are typically not accepted as legal tender in many jurisdictions, optionally the escrow process would also involve government fiat currency (that is, the legal currency of a particular country). The purchase price would preferably be recorded through a native token on the block chain. Because of the necessity to perform a traditional escrow practice, the final statement would denominated in dollars, euros or yen, or another government fiat currency. The blockchain would therefore preferably include an accounting system that replicates the native currency in each jurisdiction, such that each transaction is geo coded, to reflect that local currency.

In stage 712, the purchase is performed optionally by executing the smart contract. In stage 714, title is transferred through the distributed ledger.

Figure 8:
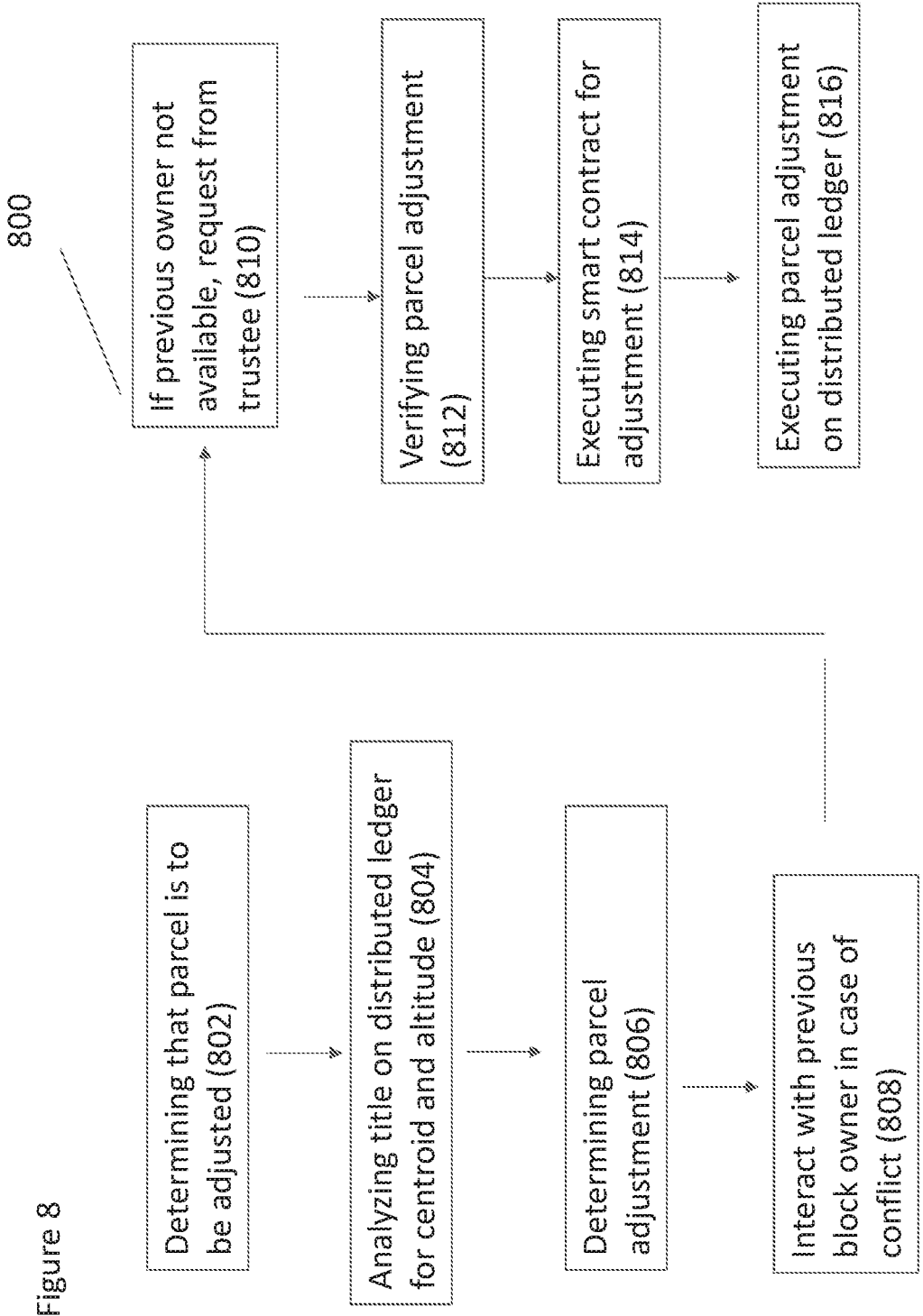
FIG. 8 relates to a non-limiting exemplary method for parcel adjustment.

FIG. 8 relates to a non-limiting exemplary method for parcel adjustment. As shown, in a method 800, it is first determined that a particular parcel is to be adjusted as shown in stage 802. Next, the title for that parcel is analyzed on the distributed ledger at least for the centroid and altitude as shown in stage 804. Next, the type of parcel adjustment as performed if shown in stage 806. Such an adjustment may optionally include for example, splitting a parcel, transferring partial rights for a parcel, recording a lean on a parcel, and the like.

In stage 808, in case there is a conflict in regard to the parcel adjustment, such as for example one parcel needs to receive a portion of a different parcel, then an interactions performed with the previous block owner, that is to say the owner of the parcel from which part of the property needs to be removed or that who otherwise has an ownership interest in the parcel that needs to be adjusted for the first parcel adjustment to occur is then performed. If the previous owner is not available in stage 810 then optionally such an adjustment may be requested from a trustee. For example the previous owner may be dead, or otherwise unavailable, the previous owner may also refuse to execute this particular transfer.

For example in the case of bankruptcy, the previous owner may not be in communication or the previous owner may no longer have access to the private key which is necessary to effect the transaction. In this case, the trustee can take over and cause the transaction to be performed. In stage 812, the parcel adjustment is verified. This verification is performed to be a certain, but in fact the parameters are correct, that all parties executing the adjustment actually have the right to do so. For example in the case of the trustee, proof is required that the trustee has been so instructed by the court, the heirs to the owner and so forth, as described in greater detail below with regard to FIGS. 9 and 10. Optionally in stage 814, a smart contract is used for the adjustment and is thereby executed. Although the adjustment could be executed in other ways. In stage 816, the parcel adjustment is executed on the distributed ledger.

Figure 9:
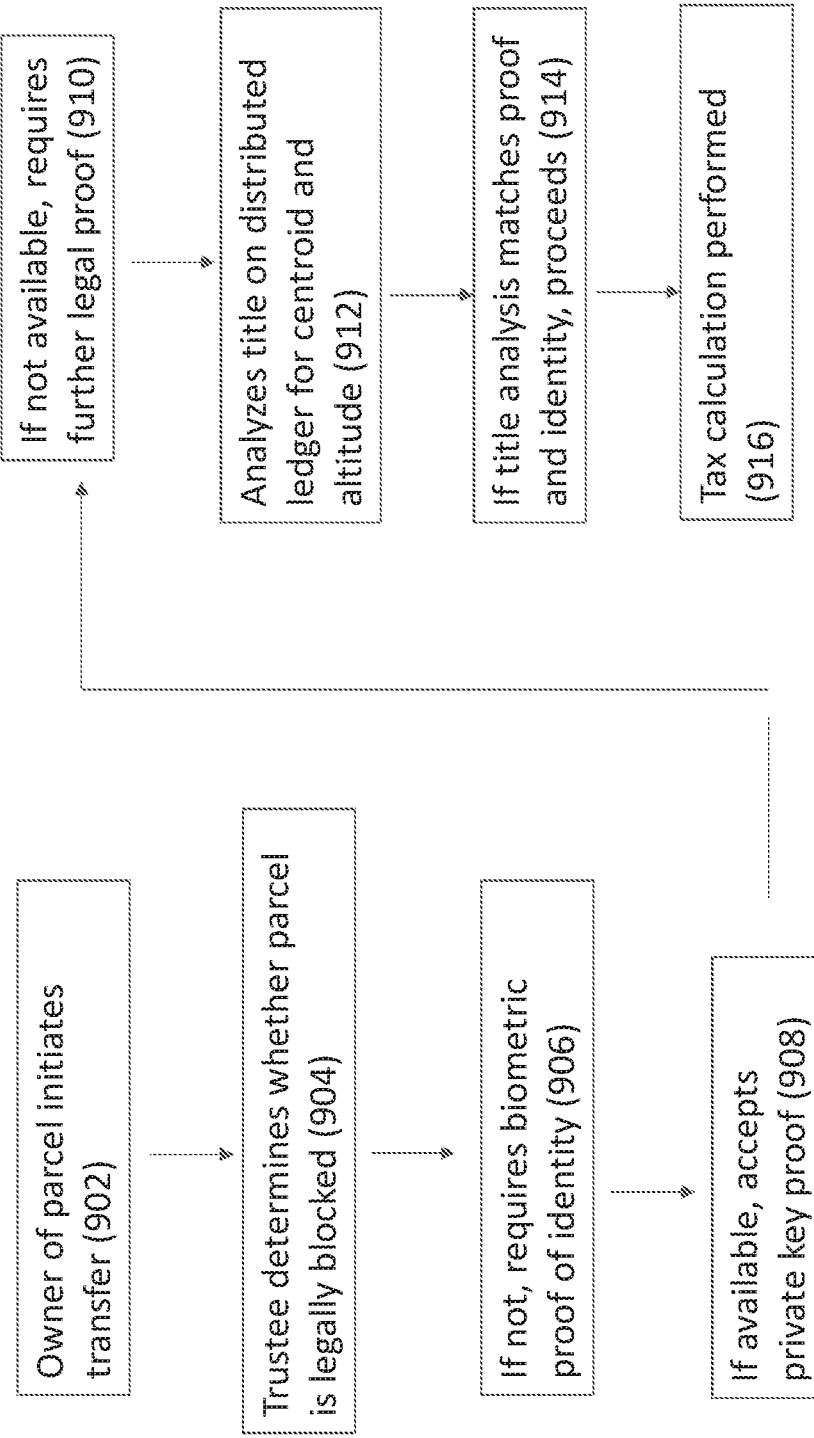
FIG. 9 relates to a non-limiting exemplary method for management of the process by a trustee, such as a title company for example.

FIG. 9 relates to a non-limiting exemplary method for management of the process by a trustee, such as a title company for example. Optionally such a trustee would have special rights or powers in a permissioned based system. For example, regarding metadata attached to the centroid, such as regarding the potential to change ownership, optionally the field would be grayed out or otherwise inaccessible for an entity other than a title company or other trustee. For this non-limiting example, the trustee would be given privileged access through a particular node, which would function as a super-node. This node would only be accessible with the requisite private keys, and optionally also biometric data or other identification, so as to prevent fraud.

As described herein, by biometric data it is meant any type of physical or physiological data that can positively identify an individual without spoofing. Non-limiting examples include fingerprint, palmprint or handprint scans; a live selfie; voiceprint; retinal print; and the like.

As shown in a method 900, the owner of the parcel initiates transfer in stage 902. The trustee then determines whether the parcel is legally blocked in stage 904, for example due to a mortgage or other lien being placed on the property, or a dispute of ownership.

If the parcel is not legally blocked, then in stage 906, the trustee requires proof of ownership, which is preferably biometric proof of ownership. Optionally such biometric proof is coded into the blockchain, but is only accessible to the trustee (or other trusted legal entity, such as a government entity).

If private key proof of ownership is available, then in stage 908, the trustee requires provision of such private key proof. If private key proof of ownership is not available, then in stage 910, the trustee requires further legal proof for the transfer, such as a court order for example.

In stage 912, the trustee analyzes title on distributed ledger for centroid and altitude, which are the parameters necessary to define the parcel. In stage 914, if the title analysis matches the proof and the identity information provided, the trustee proceeds. Optionally a tax calculation is performed by the trustee, or according to information provided by the trustee to a government agency in stage 916.

Figure 10:
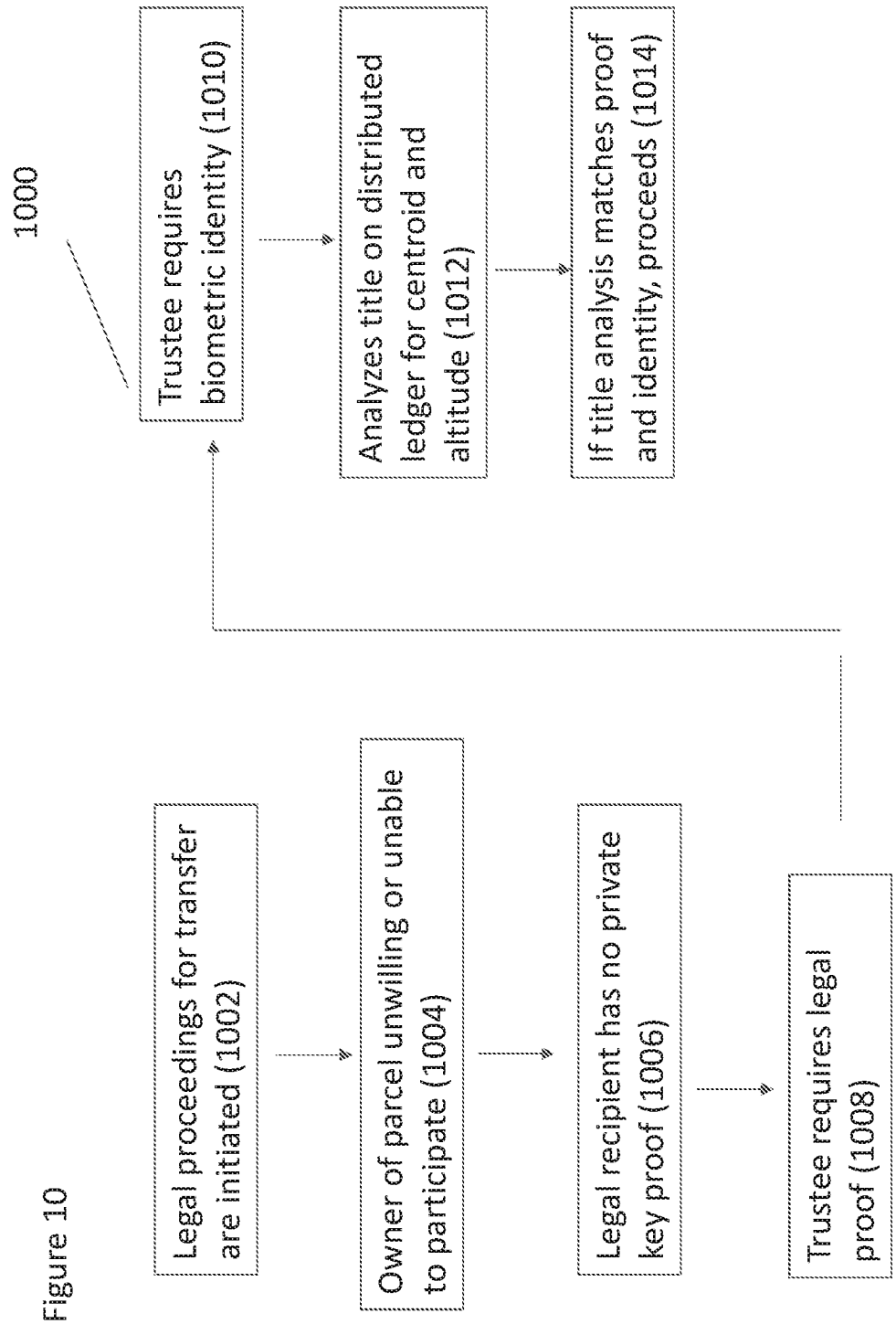
FIG. 10 relates to a non-limiting exemplary method for control of the process by a trustee.

FIG. 10 relates to a non-limiting exemplary method for control of the process by a trustee, for example in a situation in which the owner of the parcel was unable or unwilling to participate. Theoretically, a blockchain based property system in which access and transfer are only permitted through the use of private keys, could result in "orphan" properties if the owner is unwilling or unable to participate. For example, the owner may die intestate, in which case the keys would be unavailable. Or, in the case of bankruptcy or foreclosure, the owner may be unwilling to participate.

To prevent this problem, optionally the trustee, such as a title company, may be provided special powers to control property rights in a permissioned based system or alternatively may write a new transaction in a non-permissioned based system where all valid transactions can be explained by on chain analysis. For example, if the property owner dies intestate in California, then it would be necessary to petition the court, which has the authority to sign off. Optionally more than one node or authorized party would be required to sign off on such special control of property rights, such that for example the court and the trustee could both be required to sign off on such an override. The blockchain based title process could also optionally be connected to government title authority to mirror government title information to the blockchain.

As shown in a process 1000, there is provided a method for the trustee to take over a transfer or other parcel management process, in a situation in which the parcel owner is unwilling or unable to participate.

In stage 1002, legal proceedings for the transfer of the parcel are initiated, for example due to foreclosure, need to pay a lien that is due or overdue, a transfer required through court order, a transfer to be performed due to execution of a will through probate or execution of a transfer due to an owner dying intestate, and the like.

In stage 1004, the trustee verifies that the owner is unwilling or unable to participate. In stage 1006, the trustee verifies that the legal recipient of the parcel has no private key proof that indicates that the transfer may occur directly through the blockchain.

In stage 1008, in order for the trustee to perform the transfer without participation of the owner, the trustee requires legal proof that transfer of the parcel ownership is to occur, for example according to a court order.

In stage 1010, the trustee optionally also requires biometric identity for the legal recipient, for example to prevent fraud. In stage 1012, the trustee analyzes title on distributed ledger for centroid and altitude, which are the parameters necessary to define the parcel. If the title analysis matches the legal proof, such as the court order, and optionally the other identification proof (such as biometric proof) also matches the parameters of the legal proof, then the trustee effects transfer in stage 1014. The trustee may do so under these conditions, even without participation of the owner of the parcel.

Figure 11:
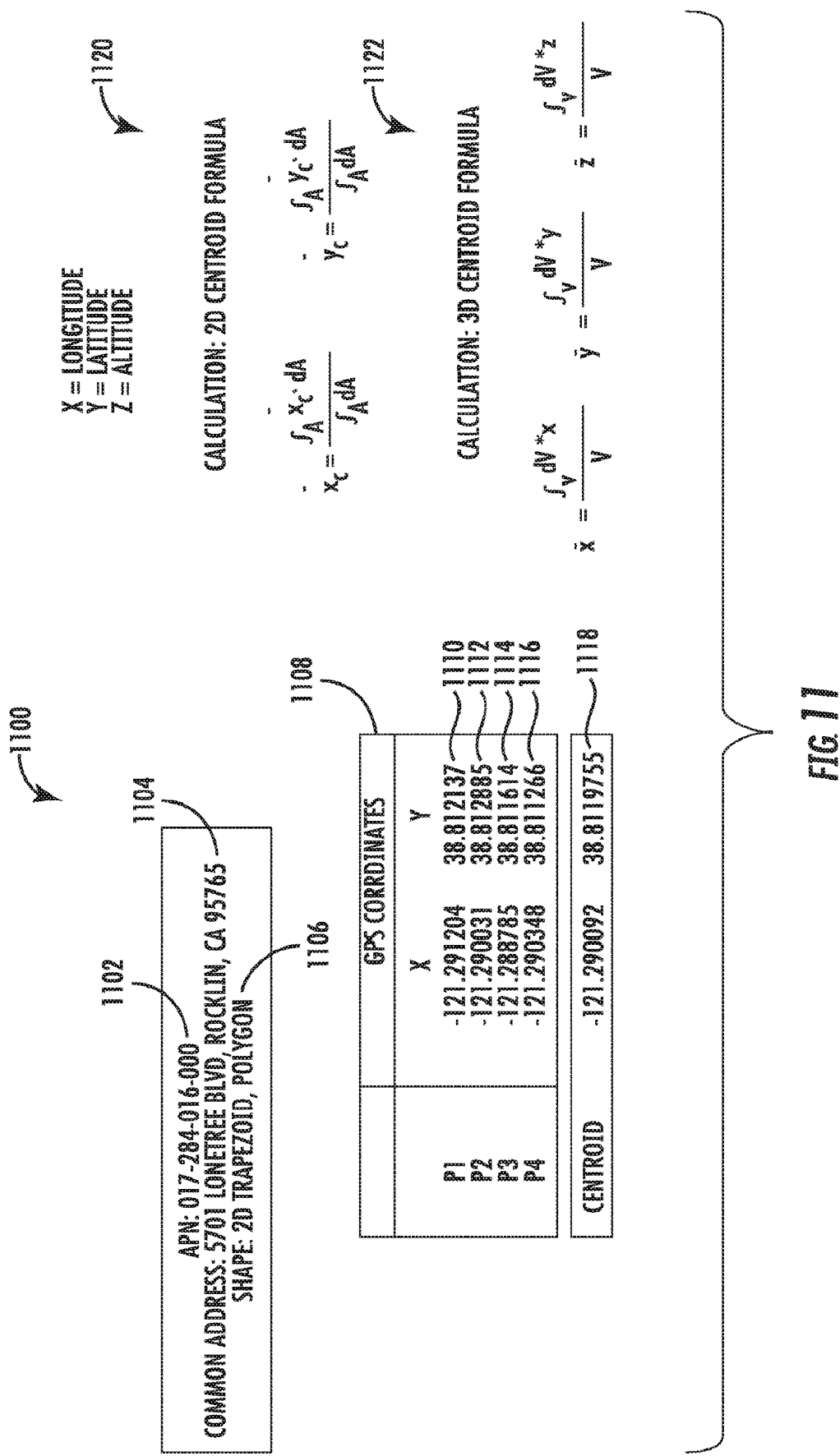
FIG. 11 shows a non-limiting example of a calculation of a two dimensional centroid according to at least some embodiments.

FIG. 11 shows a non-limiting example of a calculation of a two dimensional centroid according to at least some embodiments. As shown, a calculation 1100 features an APN (assessor's parcel number) 1102, given as 017-284-016-000, related to a specific common address 1104, also known as the street address. The shape is given as two dimensional, trapezoidal 1106, which is used as the basis for the calculation. The APN is the parcel number of local government authority that relates to titles.

The GPS (Global Positioning System) coordinates are given as 1108, with specific corners P1 (1110), P2 (1112), P3 (1114) and P4 (1116). GPS coordinates use positive and negative numbers. If the latitude coordinate is positive, the coordinate is above the Equator. If the latitude coordinate is negative, the coordinate is below the Equator. If the longitude coordinate is positive, the coordinate is east of the Prime Meridian. If the longitude coordinate is negative, the coordinate is west of the Prime Meridian. In the coordinates, longitude is given first (an X variable), latitude is given second (a Y variable). In this case, all four points are located above the Equator and west of the Prime Meridian.

The result of the centroid calculation is given in 1118, while the 2D calculation is shown in 1120. The 3D calculation is shown in 1122.

Figure 12:
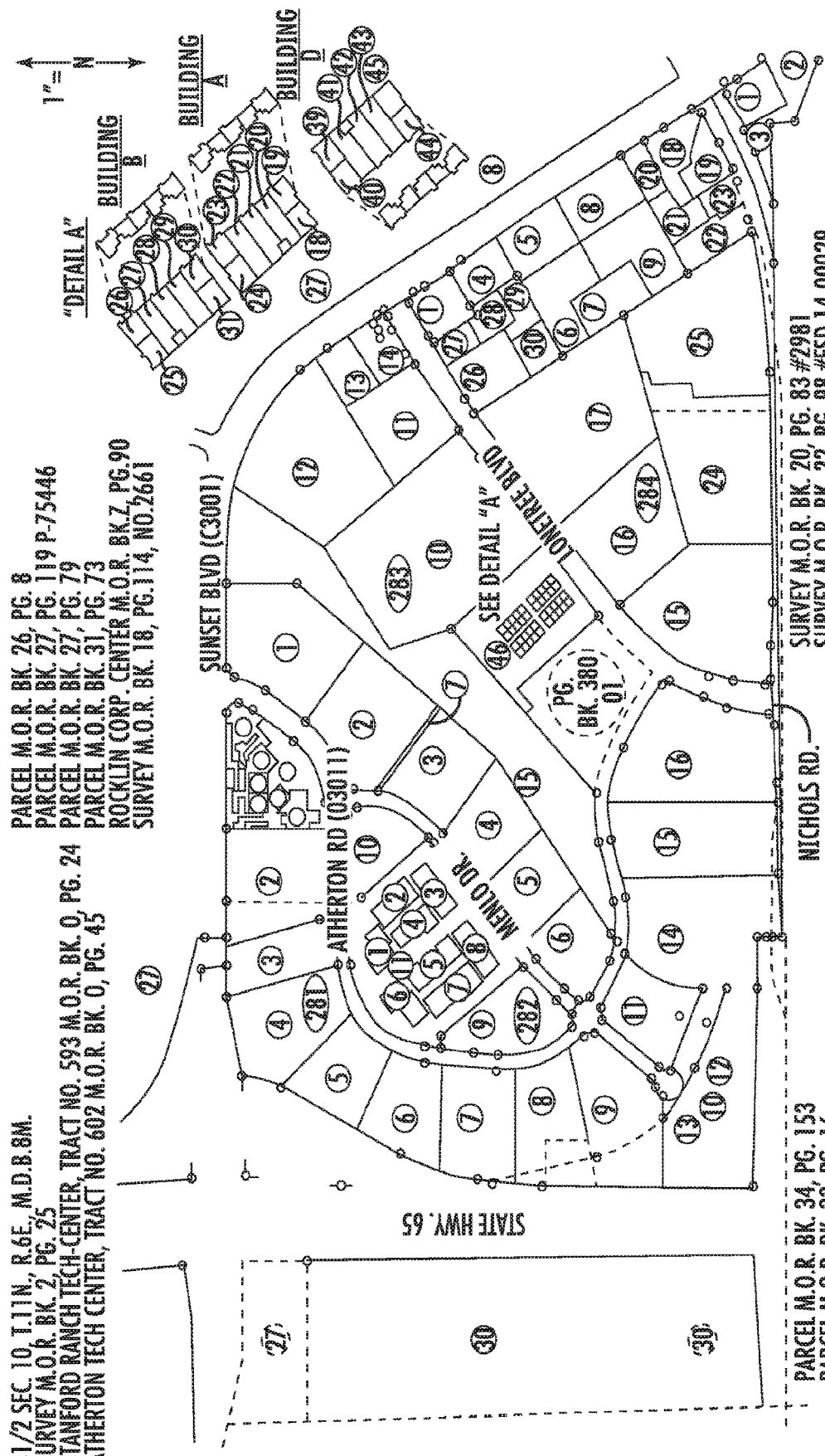
FIG. 12 shows a non-limiting example of a plat map in relation to the calculation of FIG. 11.

FIG. 12 shows a non-limiting example of a plat map in relation to the calculation of FIG. 11. The specific parcel for which the calculation is being performed is outlined in yellow and labeled as 284.

Figure 13:
FIG. 13 shows a Google Earth photo of the area in the plat map of FIG. 12.

FIG. 13 shows a Google Earth photo of the area in the plat map of FIG. 12.

Figure 14:
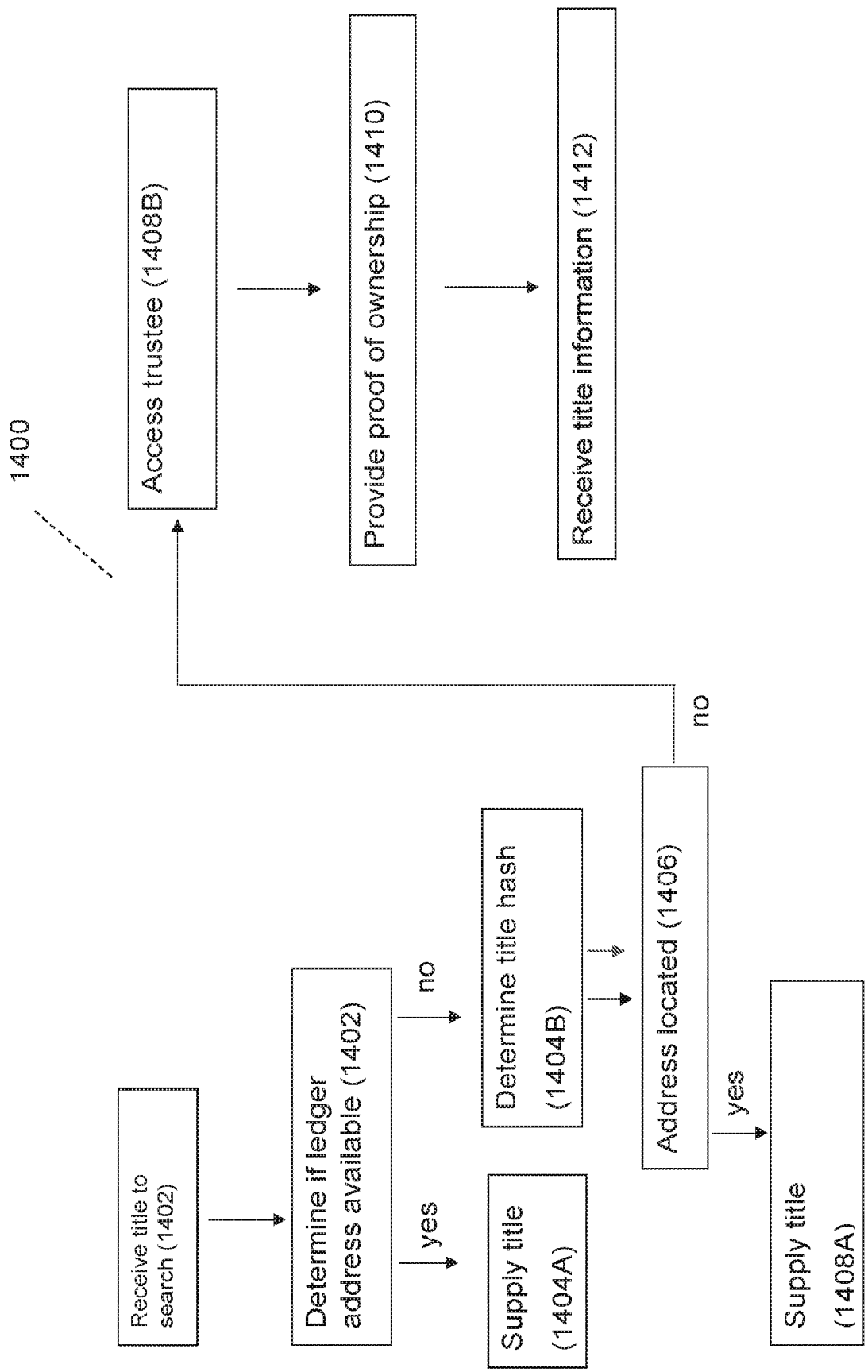
FIG. 14 shows a non-limiting, exemplary method for title search.

FIG. 14 shows a non-limiting, exemplary method for title search. As shown in a method 1400, a title to be searched is received at 1402. The title information may for example relate to a traditional mailing or physical address and/or to a centroid calculation. Optionally the title information includes a distributed ledger address, information about the owner of the property and so forth. In 1402, it is determined whether the ledger address is available. Having the address of title on the distributed ledger available, such as for example an Ethereum address or an address on another blockchain, means that in 1404A, the title information can be directly supplied. There are a variety of circumstances under which this could occur, such as for example the owner of the property maintaining the title information, including the correct address on the blockchain, in a digital wallet, so that the information could be easily supplied.

However the address on the distributed ledger that is associated with the title information for the property may not be available. In that case, if other information is available, then it may be possible to search for the address on the distributed ledger. For example, in 1404B a title hash could be determined. This hash could for example be based upon a private key of the owner of the property, the calculation information for the centroid and/or alternatively or additionally, other types of information. As long as this information could be used to calculate a unique hash and that unique hash was associated or associatable with the correct address on the distributed ledger, then the correct address could be determined in 1406. In that case, the title information would again be supplied in 1408A.

Otherwise, in 1408B, the title information could be requested from a trustee. Such a trustee could be automated, for example based upon smart contracts. The information required by the trustee for verification could be stored on chain or off chain; that is, on or off the distributed ledger (blockchain). In 1410, the trustee could require proof of ownership from the owner of the property and/or some type of legal obligation on behalf of the requesting entity, such as a mortgage bank in regard to foreclosure, before supplying the title information. In 1412, the title information would be supplied if the trustee's requirements were met.

Figure 15:
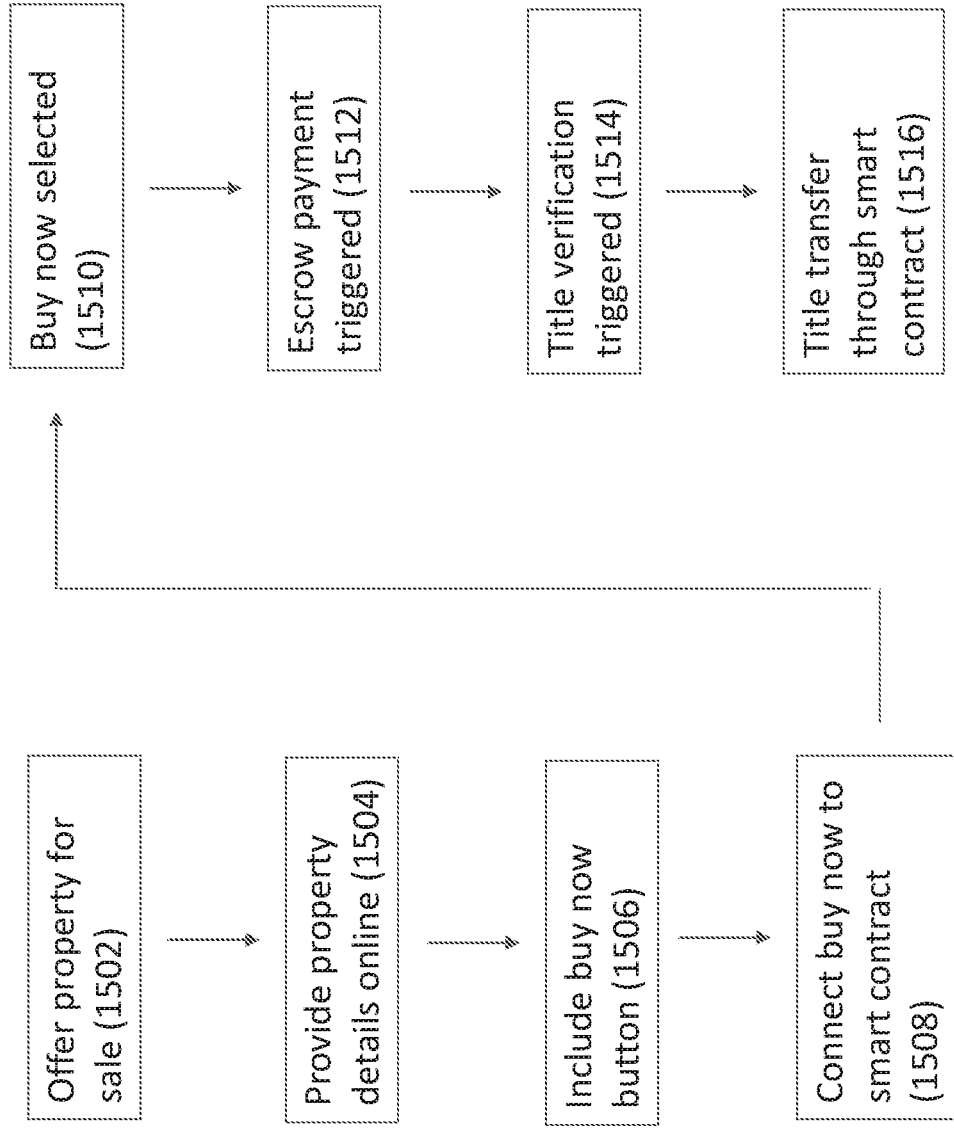
FIG. 15 shows a non-limiting, exemplary method for a property sales process.

FIG. 15 shows a non-limiting, exemplary method for a property sales process, with an optional, exemplary automatic transfer process trigger. As shown in a method 1500, a property is offered for sale in 1502. The property details are preferably provided online 1504, to enable association with a buy now button in 1506. By "button", reference is made to some type of automated purchase trigger, which may be implemented through a GUI gadget or widget, but may also be implemented through another type of automated process.

In 1508, the buy now button is connected to a smart contract. The smart contract preferably enables automated on chain transactions, including without limitation transfer of funds and transfer of title. A plurality of smart contracts may be connected to the buy now button, for example to allow for back office supporting actions and transactions to be performed, for example and without limitation as described with regard to FIG. 16.

In 1510, the buy now button is selected, for example through a GUI gadget or widget or through some other type of automated process. This selection preferably triggers a cascade of actions which enable ownership of the property to be transferred, whether wholly on-chain or partially on-chain and partially off-chain.

In 1512, escrow payment is triggered. For example, if the buy now button is connected to a smart contract which is enabled to handle payment, then optionally payment is directly made into escrow on-chain. For example, payment could be made with a cryptocurrency and the payment information could be stored on-chain. Alternatively, if payment was made with a fiat currency, the fiat currency could be converted to cryptocurrency. Also additionally and alternatively, the fiat currency payment details, including the fiat currency escrow account with which they are associated, could be stored on-chain.

In 1514, title verification is triggered. Title verification may be performed automatically through a smart contract. Title verification may be performed through any suitable method as described herein, but could also be performed through a separate manual process. Preferably, title verification is performed on-chain through a smart contract.

Title transfer is then performed in 1516 when one or more title transfer requirements have been met. Again, title transfer may be performed through any suitable method as described herein, but could also be performed through a separate manual process. Preferably, title transfer is performed on-chain through a smart contract.

Figure 16:
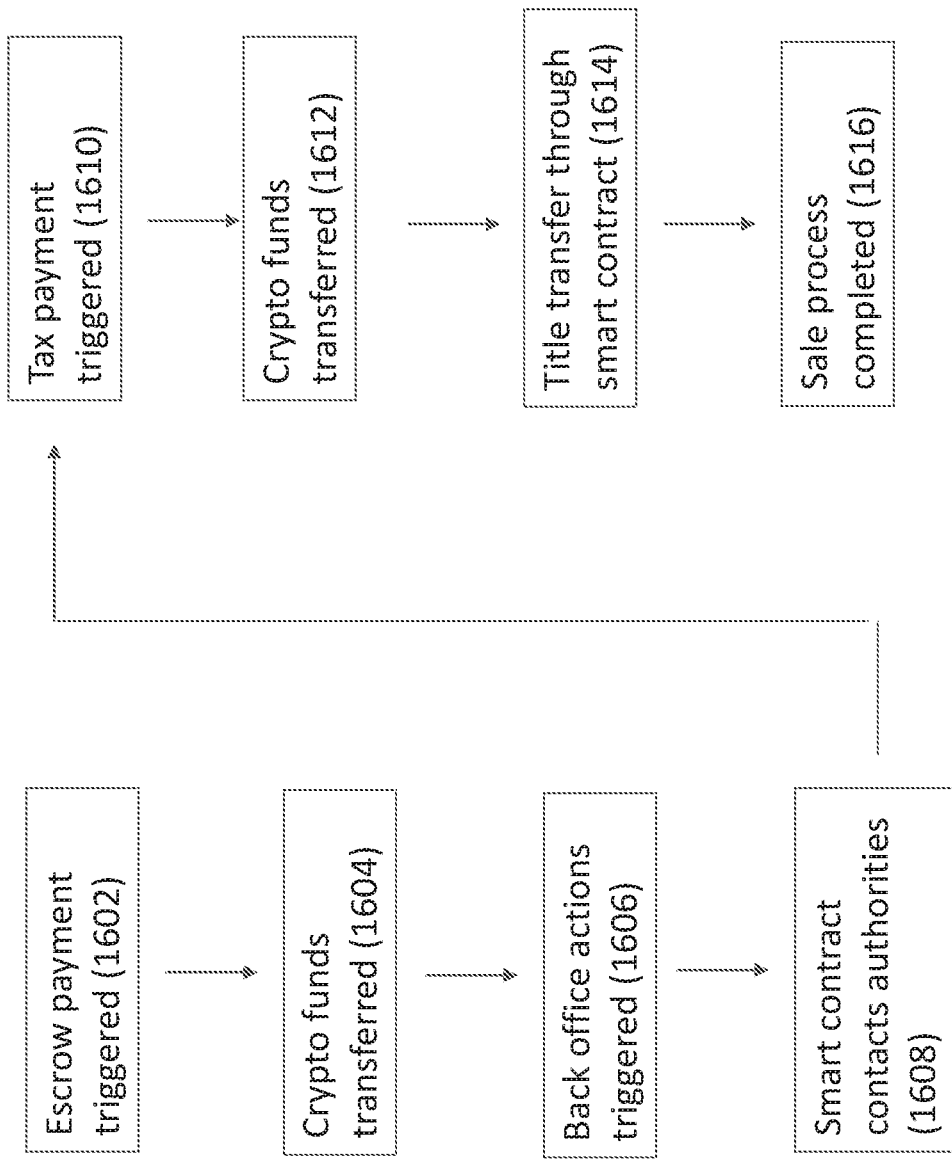
FIG. 16 shows a non-limiting, exemplary method for supporting actions taken at the time of sale of a property.

FIG. 16 shows a non-limiting, exemplary method for supporting actions taken at the time of sale of a property. A method 1600 preferably starts with escrow payment being triggered in 1602, for example as previously described. In 1604, cryptocurrency funds are preferably transferred for the escrow, for example through an on-chain transaction mediated by a smart contract. For example, a user cryptocurrency wallet as is known in the art could be used to transfer the funds; the user could sign the smart contract with a private key, and then the smart contract would cause funds to be transferred from the user wallet.

In 1606, one or more back office actions are triggered. Non-limiting examples of such back offices transactions include internal routing of funds from escrow to the agents of a real estate brokerage, vendors, and employees; and quality control checks before payments are made for verification of fully executed contracts and disclosures. Additionally legacy siloed databases can be updated upon the close of escrow such as traditional MLS(s) (Multiple Listing Services), private and proprietary data bases such as internal spread sheets and accounting systems via smart contracts and API's.

In 1608, preferably a smart contract, which is more preferably invoked due to one or more of back office actions being triggered, contacts the authorities regarding the impending sale of the property. A tax payment is then triggered in 1610. The tax payment may be triggered according to a smart contract or according to a direct request from the authority, such as a government agency for example, outside of a smart contract invocation. Cryptocurrency funds may be transferred in 1612 to cover the tax payment.

Title transfer is then performed in 1614, for example as previously described, preferably through a smart contract. In 1616, the sales process is completed.

Figure 18:
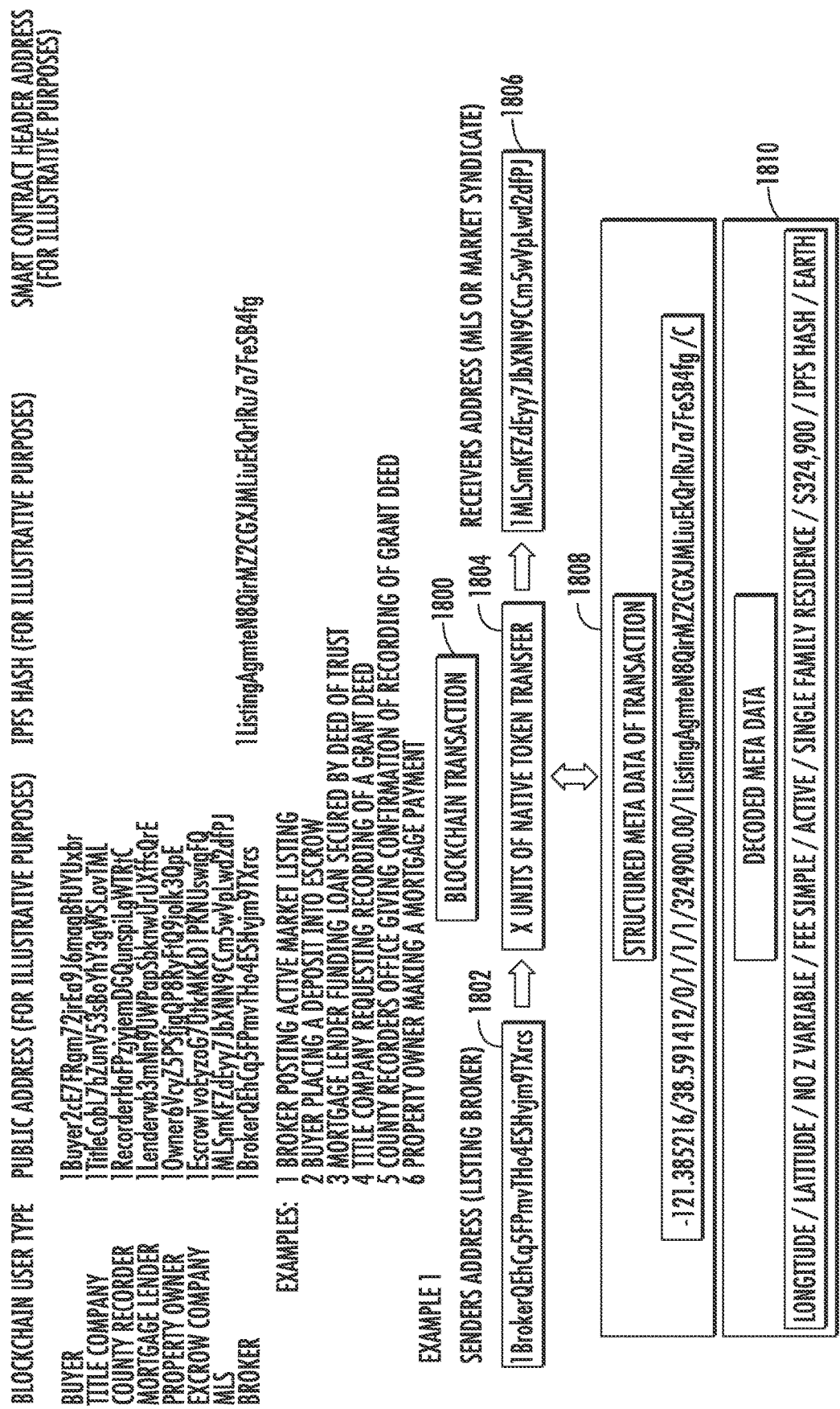
FIGS. 18-23 relate to non-limiting exemplary methods for performing various real estate transactions on the blockchain.

FIG. 18 shows a non-limiting, exemplary method for a real estate listing as a transaction on the distributed ledger. A method 1800 is performed for a particular transaction, which in this non-limiting example involves a Broker that listed a Single Family Residence for sale at $324,900 USD as an active market listing at 1428 Gladstone Drive, Sacramento, Calif., from the Geo Coordinates, the decoded meta data fields and listing agreement with IPFS Hash. The house was sold in the following process. A broker lists the home at 1802, with an address on the blockchain. At 1804, some type of token transfer is performed, which may involve an actual cryptocurrency transfer, fiat currency or a native token transfer for native tokens on the blockchain. At 1806, a receiver, such as an MLS or other real estate listing service, receives the tokens and lists the property. Structured metadata of the transaction is shown at 1808; decoded metadata 1810 may be accessible upon application of an appropriate private key, for privacy reasons.

Figure 19:
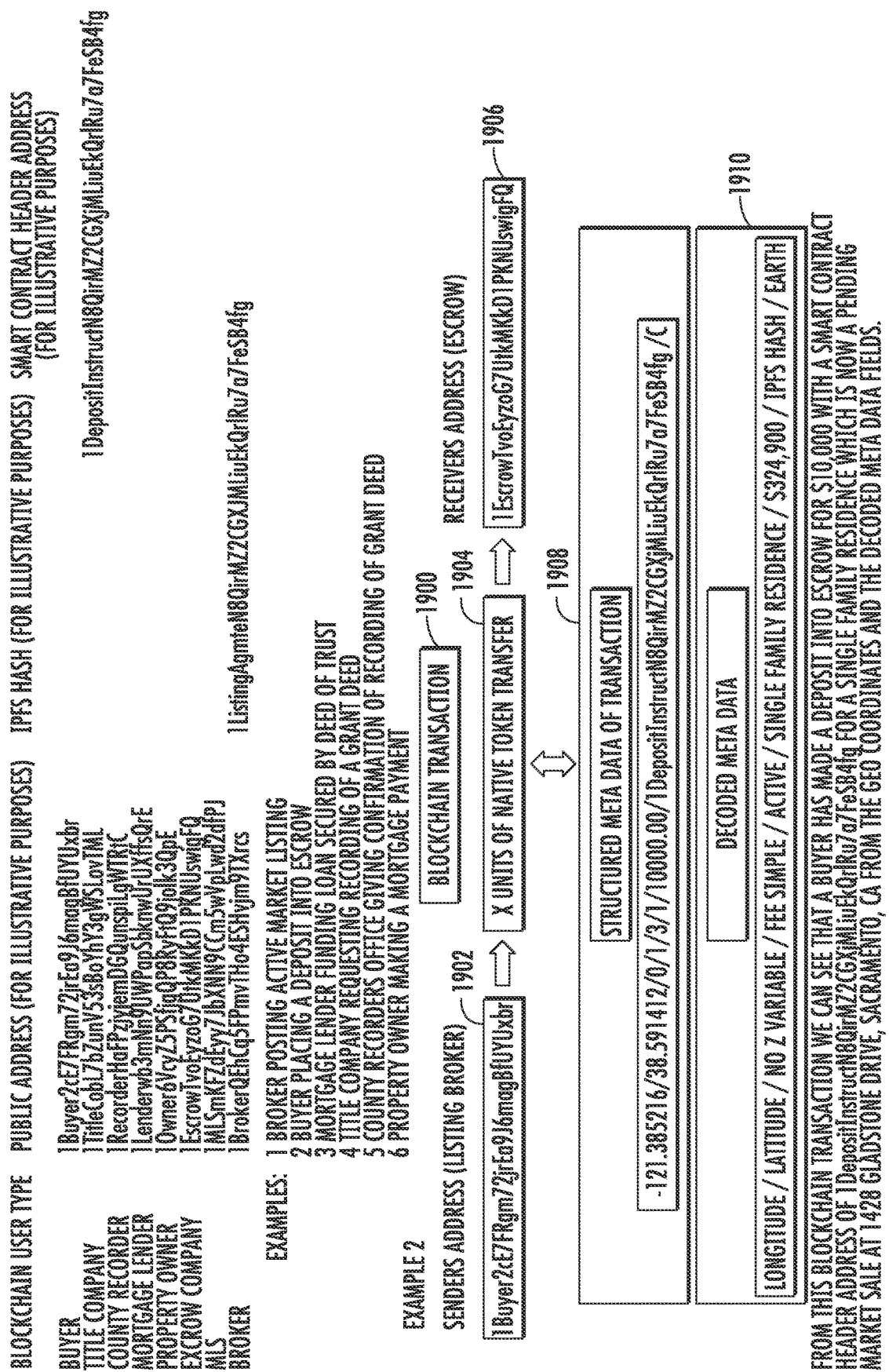

FIG. 19 shows a non-limiting, exemplary method for an escrow payment as a transaction on the distributed ledger. A method 1900 is performed for a particular transaction, which in this non-limiting example involves a Buyer who has made a deposit into escrow for $10,000 with a smart contract header address of 1DepositInstructN8QirMZ2CGXjMLiuEkQriRu7a7FeSB4fg for a Single Family Residence which is now a pending market sale at 1428 Gladstone Drive, Sacramento, Calif. from the Geo Coordinates and the decoded meta data fields.

In this non-limiting example, a sender address on the blockchain 1902, that of the buyer, sends tokens in 1904. At 1904, some type of token transfer is performed, which may involve an actual cryptocurrency transfer, fiat currency or a native token transfer for native tokens on the blockchain. A receiver address 1906 on the blockchain, that of escrow, receives the payment.

Structured metadata of the transaction is shown at 1908; decoded metadata 1910 may be accessible upon application of an appropriate private key, for privacy reasons.

Figure 20:
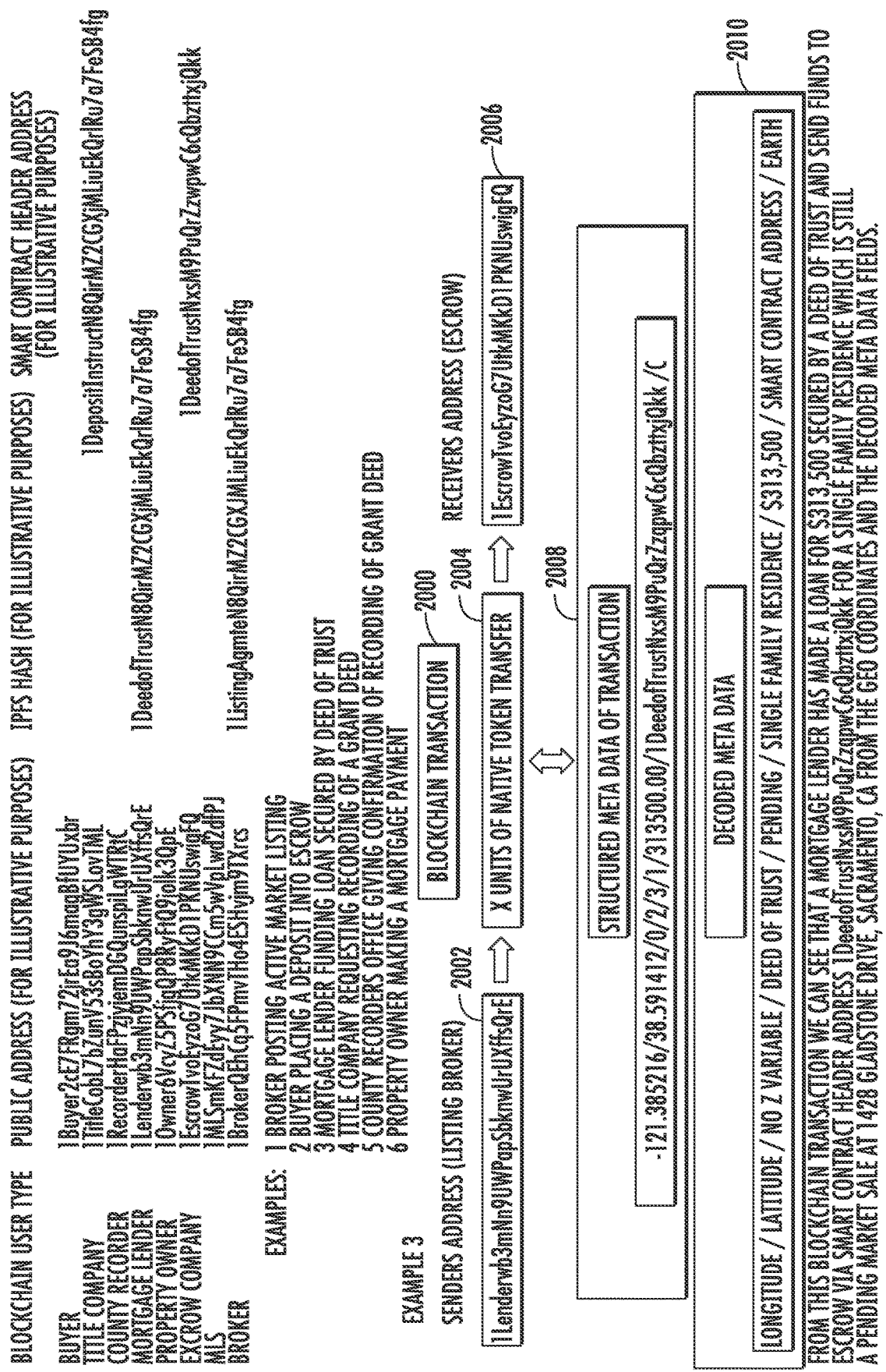

FIG. 20 shows a non-limiting, exemplary method for a payment from a lender to escrow as a transaction on the distributed ledger. A method 2000 is performed for a particular transaction, which in this non-limiting example involves a Mortgage Lender that has made a loan for $313,500 to be secured by a recorded Deed of Trust and sent funds to escrow via smart contract header address 1DeedofTrustNxsM9PuQrZzwpwC6cQbZttXjQkk for a Single Family Residence which is still a pending market sale at 1428 Gladstone Drive, Sacramento, Calif. from the Geo Coordinates and the decoded meta data fields.

In this non-limiting example, a sender address on the blockchain 2002, that of the mortgage lender, sends tokens in 2004. At 2004, some type of token transfer is performed, which may involve an actual cryptocurrency transfer, fiat currency or a native token transfer for native tokens on the blockchain. A receiver address 2006 on the blockchain, that of escrow, receives the payment.

Structured metadata of the transaction is shown at 2008; decoded metadata 2010 may be accessible upon application of an appropriate private key, for privacy reasons.

Figure 21:
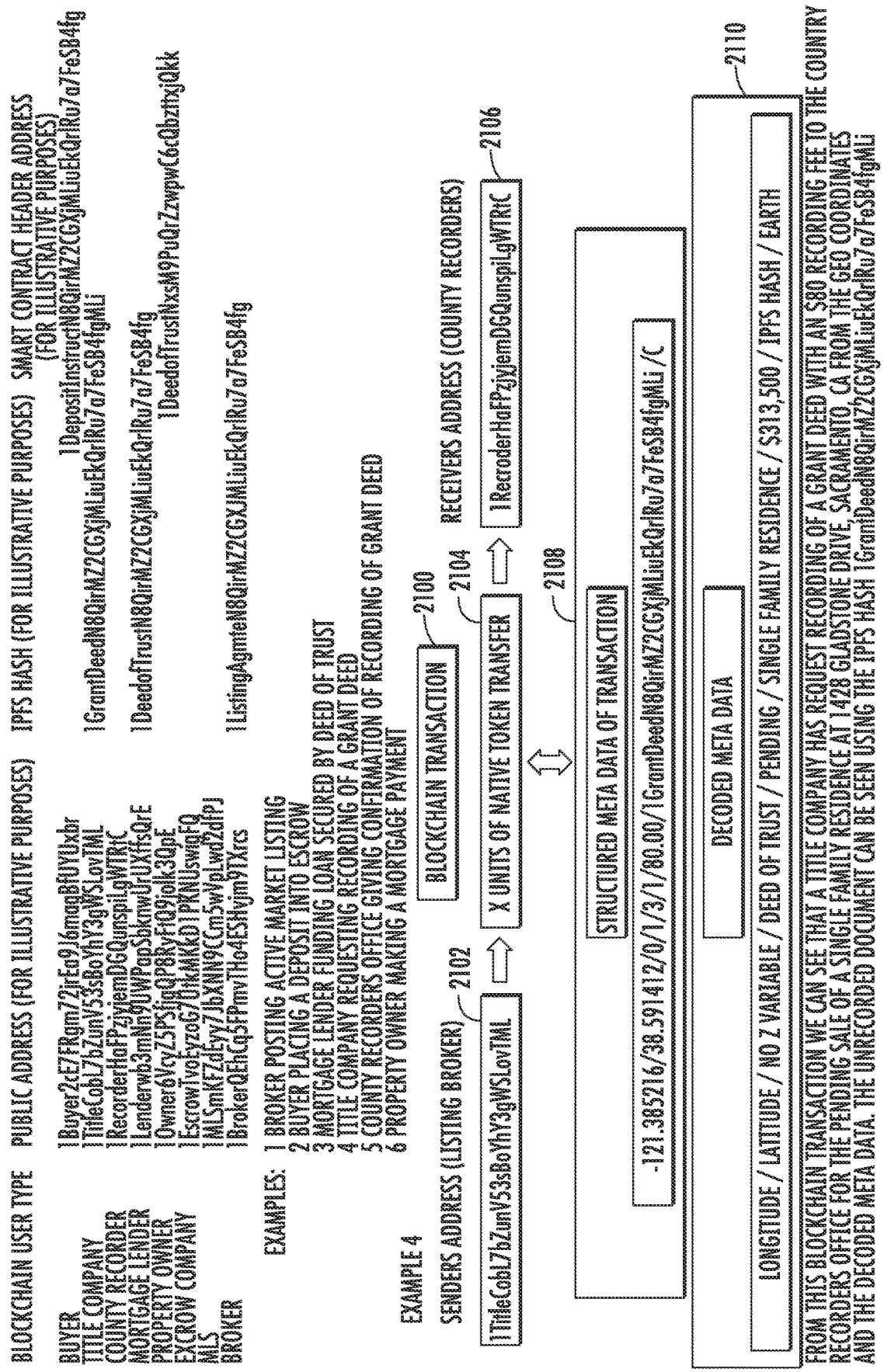

FIG. 21 shows a non-limiting, exemplary method for a title company recording a deed as a transaction on the distributed ledger. A method 2100 is performed for a particular transaction, which in this non-limiting example involves a Title Company that has requested recording of a Grant Deed with an $80 recording fee to the county recorder's office for the pending sale of a single family residence at 1428 Gladstone Drive, Sacramento, Calif. from the geo coordinates and meta data. The unrecorded document can be seen using the IPFS hash 1GrantDeedN8QirMZ2CGXjMLiuEkQriRu7a7FeSB4fgMLi.

In this non-limiting example, a sender address on the blockchain 2102, that of the title company, sends tokens in 2104. At 2104, some type of token transfer is performed, which may involve an actual cryptocurrency transfer, fiat currency or a native token transfer for native tokens on the blockchain. This transfer also involves the recording of information as shown. A receiver address 2106 on the blockchain, that of the county recorder, receives the payment and completes the requested recording of information, in this non-limiting example a grant deed.

Structured metadata of the transaction is shown at 2108; decoded metadata 2110 may be accessible upon application of an appropriate private key, for privacy reasons.

Figure 22:
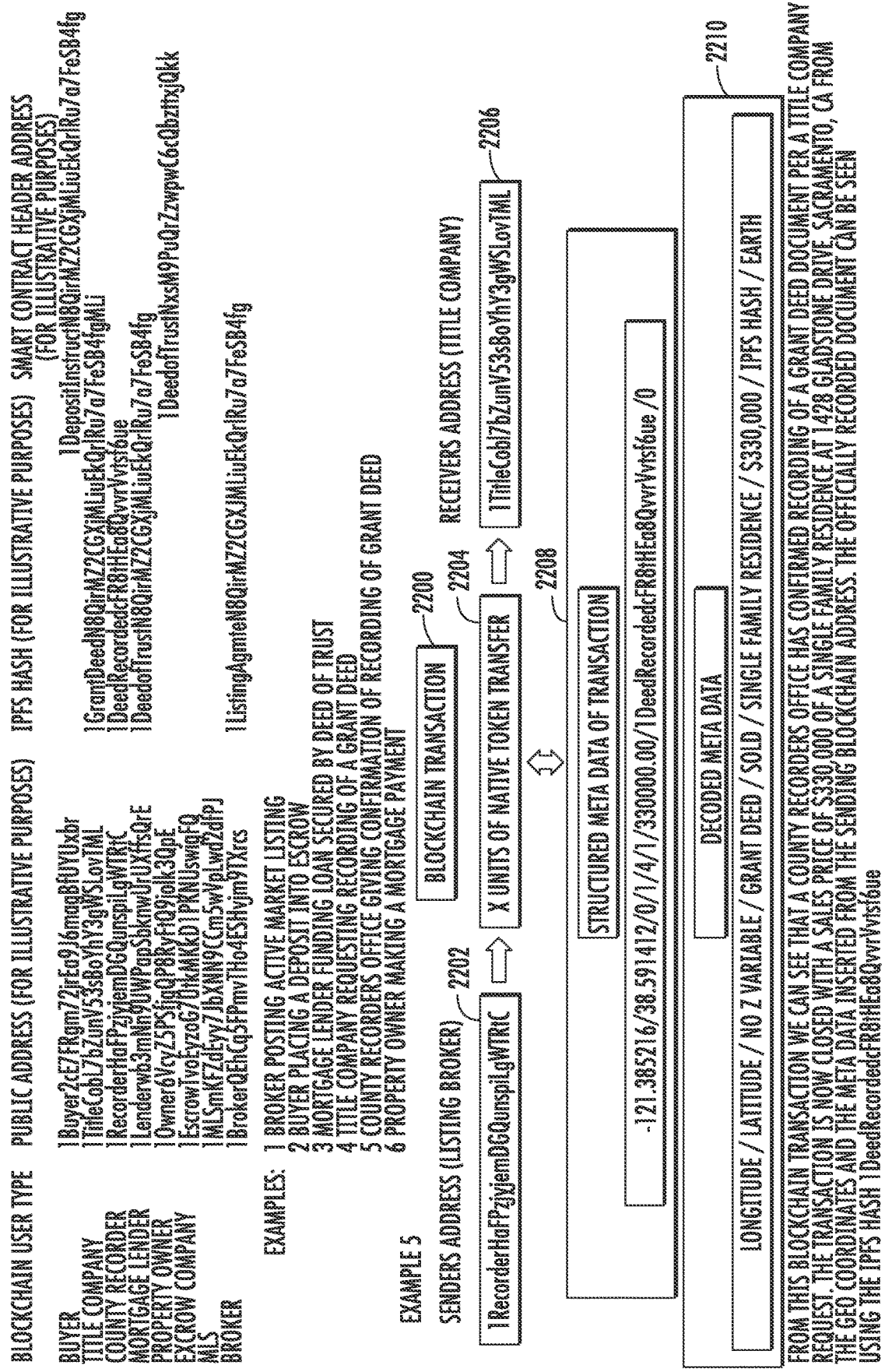

FIG. 22 shows a non-limiting, exemplary method for a title company receiving confirmation of recording a deed as a transaction on the distributed ledger. A method 2200 is performed for a particular transaction, which in this non-limiting example involves a County Recorder's Office that has confirmed recording of a Grant Deed Document per a Title Company request. The transaction is now closed with a sales Price of $330,000 of a single family residence at 1428 Gladstone Drive, Sacramento, Calif. from the geo coordinates and meta data inserted from the sending blockchain address. The officially recorded document can be seen using the IPFS hash 1DeedRecordedcFR8tHEa8QvvrVvtsf6ue.

In this non-limiting example, a sender address on the blockchain 2202, that of the county recorder's office, sends tokens in 2204. At 2204, some type of token transfer is performed, which may involve an actual cryptocurrency transfer, fiat currency or a native token transfer for native tokens on the blockchain. This transfer also involves the recording of information as shown. A receiver address 2206 on the blockchain, that of the title company, receives notification from the county recorder's office via embedded meta data from the token received, that confirmation of the requested recording has been completed, in this non-limiting example a recorded grant deed.

Structured metadata of the transaction is shown at 2208; decoded metadata 2210 may be accessible upon application of an appropriate private key, for privacy reasons.

Figure 23:
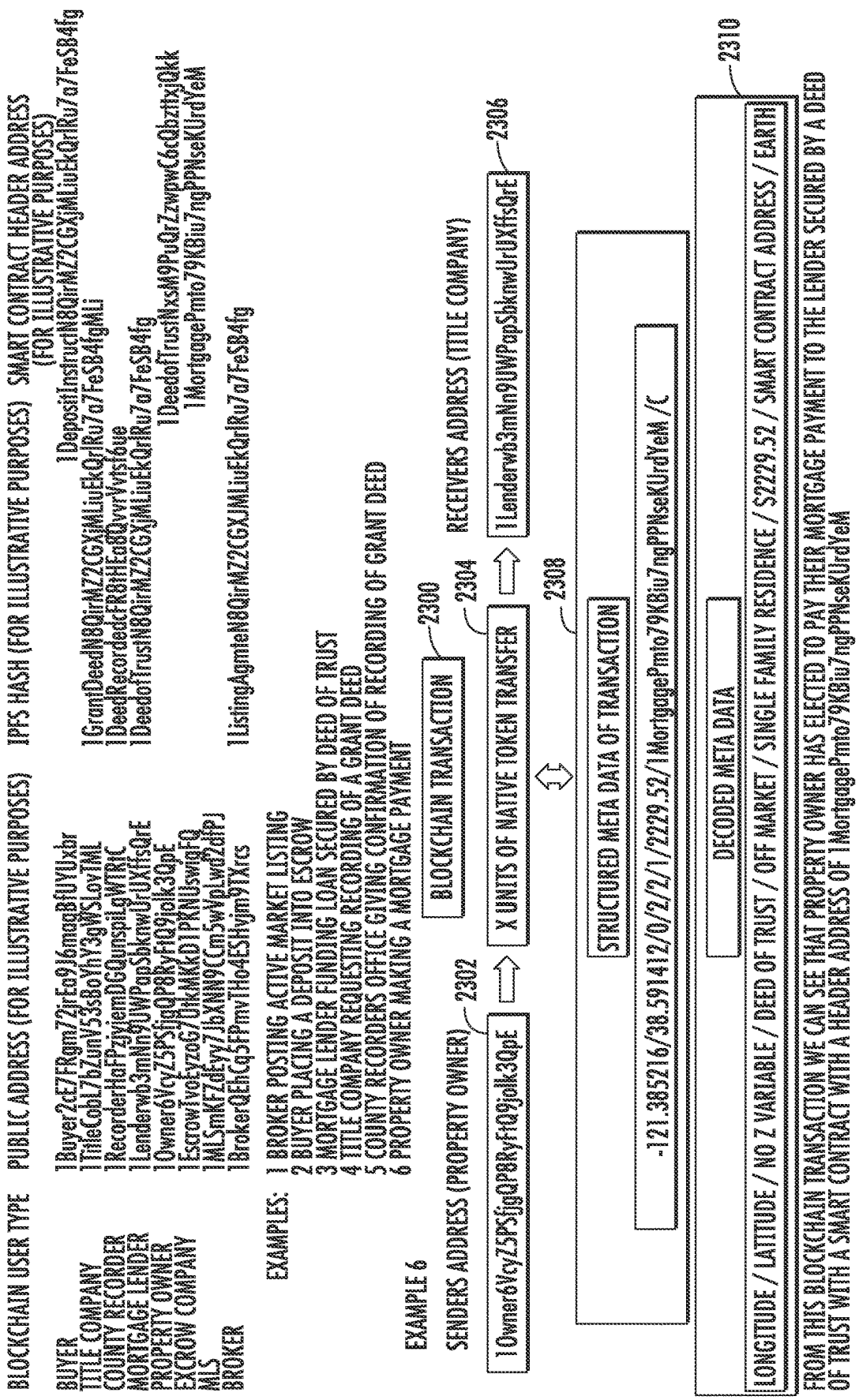

FIG. 23 shows a non-limiting, exemplary method for a property owner to make payments as a transaction on the distributed ledger. A method 2300 is performed for a particular transaction, which in this non-limiting example involves a property owner who has elected to pay their mortgage payment to the lender secured by a deed of trust with a smart contract with a header address of 1MortgagePmto79KBiu7ngPPNseKUrdYeM.

In this non-limiting example, a sender address on the blockchain 2302, that of the property owner, sends tokens in 2304. At 2304, some type of token transfer is performed, which may involve an actual cryptocurrency transfer, fiat currency or a native token transfer for native tokens on the blockchain. This transfer involves the payment of the mortgage. A receiver address 2306 on the blockchain, that of the mortgage lender, receives the payment.

Structured metadata of the transaction is shown at 2308; decoded metadata 2310 may be accessible upon application of an appropriate private key, for privacy reasons.

As described herein any of the methods of FIGS. 18-23 are performed through a computational device that preferably invokes one or more smart contracts as described herein, in order for the transaction or event to occur. Invocation of the smart contract causes it to be executed on the blockchain node. The blockchain node may be present on the same or different computational device as the one that invokes the smart contract. If present on a different computational device, then the plurality of computational devices are in communication, so that one invokes the smart contract while another causes it to execute on the blockchain node.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for determination of the boundaries of a parcel, comprising a computational device and a parcel boundary calculator operated by said computational device, for calculating a centroid comprising two dimensional boundary measures and altitude; wherein said parcel boundary is determinable for a parcel located on a unit of land featuring a plurality of parcels, wherein at least one parcel of the plurality of parcels is located above ground level; wherein said unit of land comprises a building and wherein said plurality of parcels is located within said building, said building being divided into a plurality of building units, each building unit corresponding to a parcel, wherein at least two building units are owned by separate entities; the system further comprising a blockchain node for storing a distributed ledger, wherein the centroid is securely and verifiably stored on the blockchain node and wherein the blockchain node is in communication with the computational device through a computer network; wherein upon request for verification of boundaries and altitude of a building unit of said plurality of building units, the centroid is read from the distributed ledger to confirm said boundaries and said altitude;

further comprising a second computational device in communication with the computer network, for accessing the centroid through communication with the blockchain node for performing verification of said boundaries and said altitude for said building unit;

wherein the second computational device is configured to perform a title search according to at least one parameter of the parcel through communication with the blockchain node, wherein title information is stored on the blockchain node; and wherein the distributed ledger is a permissioned blockchain, further comprising a trusted node for determining validity of a title to the parcel; wherein said trusted node determines said validity according to execution of a smart contract;

wherein said title is cryptographically stored on the distributed ledger as a title hash, wherein said title hash is calculated according to a private key of the owner of the property, and calculation information for the centroid; wherein said title is verified according to said title hash by said trusted node.

2. The system of claim 1, wherein the centroid is calculated as a single three dimensional (3D) centroid.

3. The system of claim 1, wherein the centroid is calculated as a two dimensional centroid and then the third dimension is calculated separately.

4. The system of claim 1, wherein said private key is configured to permit transfer of ownership of the parcel, wherein said transfer is recorded on the distributed ledger through the blockchain node by providing the private key to said first or second computational devices, such that said title is accessed according to said title hash, wherein said ownership is verified through said title hash with said private key.

5. The system of claim 4,
further comprising a smart contract stored on the distributed ledger, wherein transfer of the ownership of the parcel is performed through execution of the smart contract through the blockchain node by providing the private key to said first or second computational devices;
wherein said smart contract is executed with said private key, such that said title hash is accessible through said private key and said transfer of ownership is performed through said smart contract by creating a new title hash with a private key of a receiving owner of said title, and recording said new title hash on the distributed ledger; and
configured as a decentralized MLS (Multiple Listings Service).

6. The system of claim 5,
wherein the distributed ledger records Longitude, Latitude, Altitude for each property and wherein the first computational device is configured to record Longitude, Latitude, Altitude when adding a property to the distributed ledger;
wherein the distributed ledger records Property Right Type, wherein said property right type is selected from the group consisting of fee simple absolute property rights, leasehold estate, life estate, easement, lien, or another encumbrance, and wherein the first computational device is configured to record Property Right Type when adding a property to the distributed ledger;
wherein the distributed ledger records Property Status, wherein Property Status is selected from the group consisting of sold, active market listing, pending sale, active court contingent listing, and active release clause, expired listing, or withdrawn or canceled listing. and wherein the first computational device is configured to record Property Status when adding a property to the distributed ledger; and
wherein the first computational device is configured to record a change to Property Status in the distributed ledger upon execution of said change through a smart contract.

7. The system of claim 6, further comprising a plurality of smart contracts stored on the distributed ledger and a plurality of computational devices, wherein a transaction for a parcel is mediated through said plurality of smart contracts, wherein said plurality of computational devices invoke said plurality of smart contracts through the distributed ledger, wherein said plurality of smart contracts relate to at least a plurality of parties to said transaction, wherein said plurality of parties is selected from the group consisting of: Buyer, Seller, Lender, Title Company, Escrow Company, Appraiser, and Broker.

8. The system of claim 7,
wherein the distributed ledger records a type of property, wherein said type of property is selected from the group consisting of Hotel, Office, Land, SFR, Retail, Industrial, and wherein the first computational device is configured to record said Property Type when adding a property to the distributed ledger;
wherein the distributed ledger records a value transfer in local fiat currency for a transaction for said parcel, and wherein the first computational device is configured to record said value transfer on the distributed ledger when a transaction is executed;
further comprising an external database, wherein the distributed ledger records an IPFS hash or smart contract header address for said parcel to link to said external database, and wherein the first computational device is configured to record said IPFS hash or smart contract header address on the distributed ledger for said parcel;
further comprising an additional blockchain, wherein the distributed ledger records an indicator of which blockchain has relevant information for said parcel, and wherein the first computational device is configured to record said indicator for said parcel on the distributed ledger; and
wherein said first computational device executes a change to the distributed ledger by invoking a smart contract.

9. The system of claim 1, wherein said verification is performed by comparing said calculation of said centroid to coordinates as described on a land plat and to a physical location of said building unit vertically within said building.

10. A method for determining the boundaries of a parcel, the method being performed by a computational device, the method comprising calculating a centroid comprising two dimensional boundary measures and altitude, wherein said parcel boundary is determinable for one or more units on a parcel; wherein the method is performed with a system for determination of the boundaries of a parcel, comprising a computational device, a parcel boundary calculator operated by said computational device for calculating a centroid comprising two dimensional boundary measures and altitude, and a blockchain node for storing a distributed ledger, wherein the centroid is stored on the blockchain node and wherein the blockchain node is in communication with the computational device through a computer network; wherein said parcel boundary is determinable for a parcel located on a unit of land featuring a plurality of parcels, wherein at least one parcel of the plurality of parcels is located above ground level; and wherein said unit of land comprises a building and wherein said plurality of parcels is located within said building, said building being divided into a plurality of building units, each building unit corresponding to a parcel, wherein at least two building units are owned by separate entities;
wherein said centroid is stored as part of a title, wherein said title is cryptographically stored on the distributed ledger as a title hash, wherein said title hash is calculated according to a private key of the owner of the property, and calculation information for the centroid; wherein said title is verified according to said title hash;
further comprising verifying said title by a trusted node to determine whether a title transaction is to be performed.

11. The method of claim 10, wherein the centroid is calculated as a single three dimensional (3D) centroid.

12. The method of claim 10, wherein the centroid is calculated as a two dimensional centroid and then the third dimension is calculated separately.

13. The method of claim 12, wherein said unit of land comprises a building and wherein said plurality of parcels is located within said building, said building being divided into a plurality of building units, each building unit corresponding to a parcel, wherein at least two building units are owned by separate entities.

14. The method of claim 13, further comprising
storing the boundaries on a distributed ledger, said distributed ledger being operated through a plurality of computational devices;
performing title analysis of a title of a parcel stored on said distributed ledger, said performing said title analysis further comprising accessing said title hash according to said private key for determining proof of ownership; calculating said centroid to determine said boundaries of said parcel, forming a calculated centroid; comparing said calculated centroid to said centroid stored through said title hash; and
performing transfer of said parcel through said distributed ledger if ownership is confirmed according to said title hash and said calculated centroid.

15. The method of claim 14, further comprising title analysis on said distributed ledger using a "point in polygon" test to determine previous transactions in the chain of title.

16. The method of claim 15, further comprising
using biometric data in place of a private key for controlling transactions by an owner through said distributed ledger;
providing, in a permissioned based implementation, a trusted node and overriding control by a current owner of a parcel by said trusted node;
inducing transfer of said parcel by said trusted node; and
providing a plurality of trusted nodes and overriding control by said current owner of said parcel upon instruction by said plurality of trusted nodes.

17. A system for determination of the boundaries of a parcel, comprising a computational device and a parcel boundary calculator operated by said computational device, for calculating a centroid comprising two dimensional boundary measures and altitude; the system further comprising a blockchain node for storing a distributed ledger, wherein the centroid is stored on the blockchain node and wherein the blockchain node is in communication with the computational device through a computer network;

further comprising a second computational device in communication with the computer network, for accessing the centroid through communication with the blockchain node for performing verification of said boundaries and said altitude for said building unit;
wherein the second computational device is configured to perform a title search according to at least one parameter of the parcel through communication with the blockchain node, wherein title information is stored on the blockchain node; and
wherein the distributed ledger is a permissioned blockchain;
wherein said title is cryptographically stored on the distributed ledger as a title hash, wherein said title hash is calculated according to a private key of the owner of the property, and calculation information for the centroid; wherein said title is verified according to said title hash.

18. The system of claim 17, wherein said parcel boundary is determinable for a parcel located on a unit of land featuring a plurality of parcels, wherein at least one parcel of the plurality of parcels is located above ground level.

19. The system of claim 18, wherein said unit of land comprises a building and wherein said plurality of parcels is located within said building, said building being divided into a plurality of building units, each building unit corresponding to a parcel, wherein at least two building units are owned by separate entities.

20. The system of claim 19, wherein the centroid is calculated as a single three dimensional (3D) centroid.

21. The system of claim 19, wherein the centroid is calculated as a two dimensional centroid and then the third dimension is calculated separately.

* * * * *